(12) United States Patent
Imamiya

(10) Patent No.: US 12,470,819 B2
(45) Date of Patent: Nov. 11, 2025

(54) IMAGE PICKUP APPARATUS FOR SETTING POSITION FOR PERFORMING ENLARGEMENT DISPLAY FROM ENTIRE IMAGE REGION, CONTROL METHOD FOR IMAGE PICKUP APPARATUS, AND STORAGE MEDIUM

(71) Applicant: CANON KABUSHIKI KAISHA, Tokyo (JP)

(72) Inventor: Junichi Imamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/423,130

(22) Filed: Jan. 25, 2024

(65) Prior Publication Data
US 2024/0259681 A1    Aug. 1, 2024

(30) Foreign Application Priority Data
Jan. 30, 2023   (JP) ................................ 2023-011810

(51) Int. Cl.
*H04N 23/67* (2023.01)
*H04N 23/63* (2023.01)

(52) U.S. Cl.
CPC ......... *H04N 23/675* (2023.01); *H04N 23/635* (2023.01); *H04N 23/672* (2023.01)

(58) Field of Classification Search
CPC .. H04N 23/675; H04N 23/635; H04N 23/672; H04N 23/69; H04N 23/62; H04N 23/632
See application file for complete search history.

(56) References Cited

U.S. PATENT DOCUMENTS

| 2017/0064188 A1* | 3/2017 | Yoshida | H04N 23/611 |
| 2019/0243533 A1* | 8/2019 | Imamiya | H04N 23/63 |
| 2019/0246034 A1* | 8/2019 | Watanabe | H04N 23/64 |

FOREIGN PATENT DOCUMENTS

| JP | 2010141767 A | 6/2010 |
| JP | 2013201527 A | 10/2013 |

* cited by examiner

*Primary Examiner* — Gevell V Selby
(74) *Attorney, Agent, or Firm* — Canon U.S.A., Inc. IP Division

(57) ABSTRACT

An apparatus capable of visually indicates to a user whether or not execution of autofocusing at a set position is possible is provided. The apparatus includes a pickup device, and at least one processor and/or at least one circuit configured to function as a setting unit that sets a focus adjustment region, a detecting unit that detects a defocusing amount of an optical system, a determining unit that determines whether or not focus adjustment in the focus adjustment region is possible based on the defocusing amount, and a control unit that switches a display of a live view image between an unmagnification display and an enlargement display. The control unit varies a display method of the focus adjustment region between the unmagnification display and the enlargement display in accordance with to a determination result obtained by the determining unit.

19 Claims, 17 Drawing Sheets

| | UNMAGNIFICATION DISPLAY | ENLARGEMENT DISPLAY |
|---|---|---|
| (A) AF SETTING |  |  |
| (B) MF SETTING |  |  |

JUDGEMENT CONDITION: OUTER CIRCUMFERENTIAL POSITION

JUDGEMENT CONDITION: CENTER POSITION

IN FOCUS

FRONT FOCUS

BACK FOCUS

BLUR : LARGE

| | UNMAGNIFICATION DISPLAY | ENLARGEMENT DISPLAY |
|---|---|---|
| (A) WHEN FOCUS IS ADJUSTABLE |  |  |
| (B) WHEN FOCUS IS UNADJUSTABLE DISPLAY METHOD : COLOR |  |  |
| (C) WHEN FOCUS IS UNADJUSTABLE DISPLAY METHOD : MODE |  |  |
| (D) WHEN FOCUS IS UNADJUSTABLE DISPLAY METHOD : MODE |  |  |
| (E) WHEN FOCUS IS UNADJUSTABLE DISPLAY METHOD : PATTERN |  |  |

|  | UNMAGNIFICATION DISPLAY | ENLARGEMENT DISPLAY |
|---|---|---|
| (A) WHEN FOCUS IS ADJUSTABLE |  1300 1303 1304 |  1301 1306 1302 |
| (B) WHEN FOCUS IS UNADJUSTABLE |  1300 1306 1303 |  1301 1307 1302 |

WHEN SUBJECT IS DETECTED

WHEN MOVING OF FOCUS ADJUSTMENT
REGION IS SELECTED
WHEN FOCUS IS ADJUSTABLE

WHEN MOVING OF FOCUS ADJUSTMENT
REGION IS SELECTED
WHEN FOCUS IS UNADJUSTABLE

| | UNMAGNIFICATION DISPLAY | ENLARGEMENT DISPLAY |
|---|---|---|
| (A) WHEN FOCUS IS ADJUSTABLE |  |  |
| (B) WHEN FOCUS IS UNADJUSTABLE DISPLAY METHOD : COLOR |  |  |
| (C) WHEN FOCUS IS UNADJUSTABLE DISPLAY METHOD : MODE |  |  |
| (D) WHEN FOCUS IS UNADJUSTABLE DISPLAY METHOD : MODE |  |  |
| (E) WHEN FOCUS IS UNADJUSTABLE DISPLAY METHOD : PATTERN |  |  |

IMAGE PICKUP APPARATUS FOR SETTING POSITION FOR PERFORMING ENLARGEMENT DISPLAY FROM ENTIRE IMAGE REGION, CONTROL METHOD FOR IMAGE PICKUP APPARATUS, AND STORAGE MEDIUM

BACKGROUND

Technical Field

The aspect of the embodiments relates to an image pickup apparatus, a control method for the image pickup apparatus, and a storage medium, and particularly relates to a technique for controlling image display during image pickup.

Description of the Related Art

There is an image pickup apparatus, which includes an image pickup device having an image pickup surface phase difference detection function, and in which a region that is focused on by using an autofocusing function (an AF function) on a live view image (an LV image) displayed on a liquid crystal display device or the like is displayed by a frame or the like. In addition, there is an image pickup apparatus that focuses on a subject at a touch position by using an AF function when a user performs a touch operation on a display screen of a liquid crystal display device or the like on which an LV image is displayed.

In such image pickup apparatuses, there is a known technique for displaying which part of the entire image pickup region is an enlargement display region when the LV image is switched from an unmagnification display to an enlargement display so that the user is able to confirm whether or not a desired position or region is in focus. For example, Japanese Laid-Open Patent Publication (kokai) No. 2010-141767 has proposed a technique that enlarges and displays an AF region (an AF in-focus region) focused on by AF and its vicinity by using a manual focusing operation (an MF operation). In addition, Japanese Laid-Open Patent Publication (kokai) No. 2013-201527 has proposed a technique that sets the AF region and the enlargement display region separately. Specifically, Japanese Laid-Open Patent Publication (kokai) No. 2013-201527 has proposed an image pickup apparatus that changes a position of the enlargement display region in conjunction with a position of the AF region in the case of changing the position of the AF region, and changes the position of the enlargement display region without changing the position of the AF region in the case of changing the position of the enlargement display region.

With the technique described in the above-mentioned Japanese Laid-Open Patent Publication (kokai) No. 2010-141767, it is not possible to enlarge and display the image from an image region other than the vicinity of the AF in-focus region. In addition, since the enlargement display is performed from the vicinity of the AF in-focus region, it is not possible to enlarge and display the image from an image region where the AF cannot be executed. Furthermore, in the technique described in the above-mentioned Japanese Laid-Open Patent Publication (kokai) No. 2013-201527, since the position of the AF region is not changed accordingly in the case that an instruction of changing the position of the enlargement display region is issued, in order to execute the AF from a changed position of the enlargement display region, it is necessary to issue an instruction of changing the position of the AF region.

SUMMARY

Accordingly, the aspect of the embodiments provides an apparatus comprising a pickup device configured to include pixels that photoelectrically converts incident light from a subject that has passed through different regions of an exit pupil of an optical system to generate a plurality of pickup signals, and at least one processor and a memory coupled to the at least one processor, the memory having instructions that, when executed by the processor, causes the at least one processor to function as a setting unit that sets a focus adjustment region used in focus adjustment of the optical system with respect to a pickup region of the pickup device, a detecting unit that detects a defocusing amount of the optical system based on the plurality of pickup signals obtained from the focus adjustment region, a determining unit that determines whether or not focus adjustment in the focus adjustment region is possible based on the defocusing amount, and a control unit that switches a display of a live view image on a display device between an unmagnification display, which displays an entire image of the pickup region, and an enlargement display, which enlarges and displays an image of the focus adjustment region. The control unit varies a display method of the focus adjustment region between the unmagnification display and the enlargement display in accordance with to a determination result obtained by the determining unit.

Further features of the disclosure will become apparent from the following description of exemplary embodiments with reference to the attached drawings.

DESCRIPTION OF THE EMBODIMENTS

The disclosure will now be described in detail below with reference to the accompanying drawings showing embodiments thereof.

Hereinafter, an exemplary embodiment of the disclosure will be described in detail with reference to the accompanying drawings.

Figure 1A:
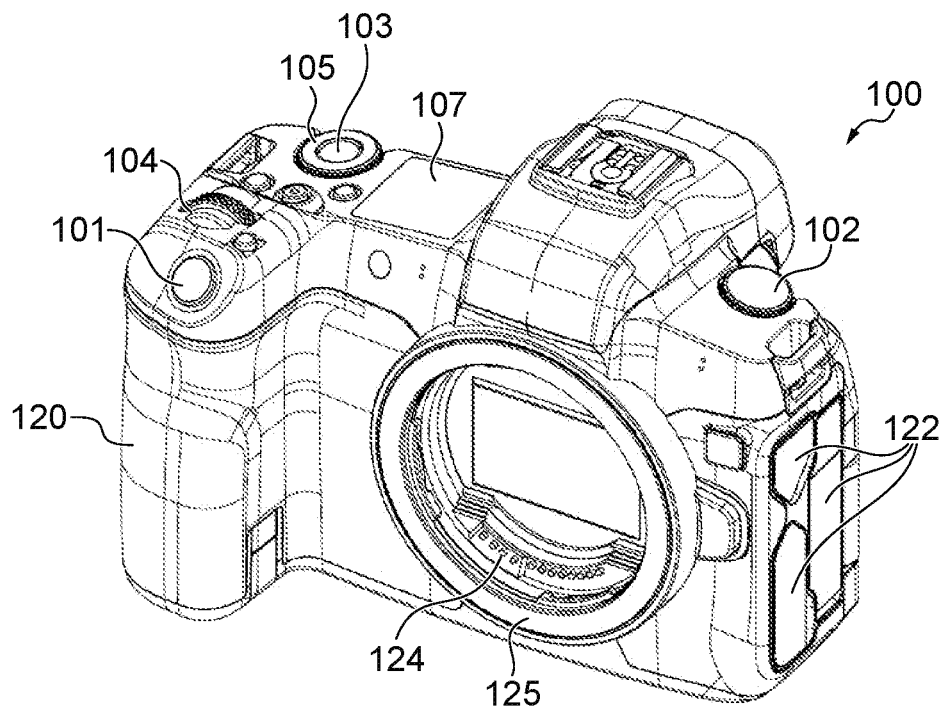
FIGS. 1A and 1B are perspective views that show an external appearance configuration of an image pickup apparatus according to an exemplary embodiment of the disclosure.
Figure 1B:
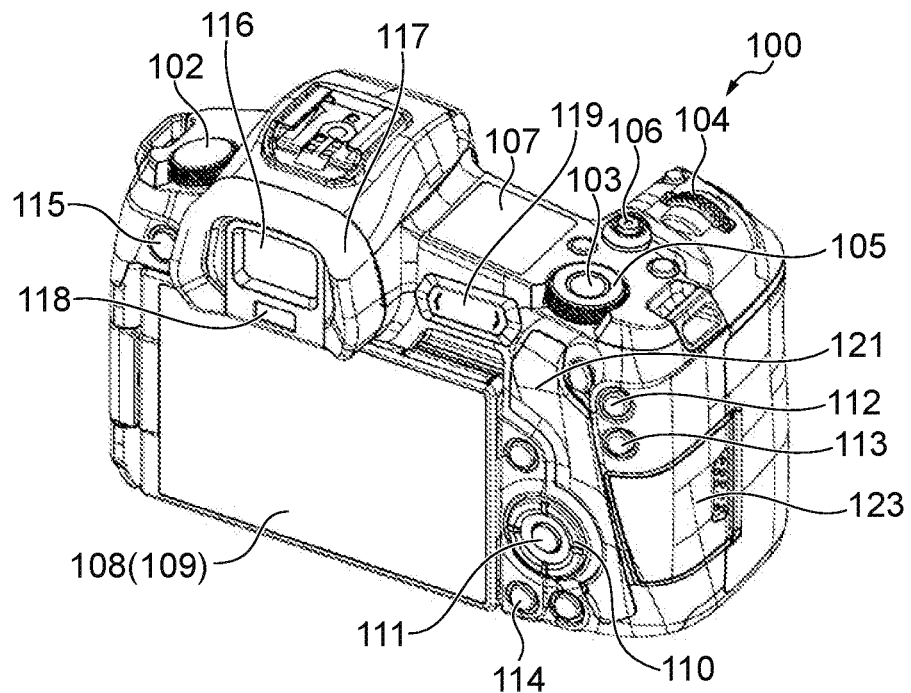

FIGS. 1A and 1B are perspective views that show an external appearance configuration of an image pickup apparatus 100 according to the exemplary embodiment of the disclosure. FIG. 1A is the perspective view of the image pickup apparatus 100 when viewed diagonally from above on the front side, and FIG. 1B is the perspective view of the image pickup apparatus 100 when viewed diagonally from above on the back side. Here, the image pickup apparatus 100 is, for example, a so-called mirrorless single-lens type digital camera. In the mirrorless single-lens type digital camera, although a lens unit (an interchangeable lens) is capable of being attached to and being detached from a camera body, "the image pickup apparatus 100" in the description of the exemplary embodiment of the disclosure refers to the camera body and does not include the lens unit.

A shutter button 101, a power switch 102, a mode change-over switch 103, a main electronic dial 104, a sub electronic dial 105, a moving image button 106, and an extra-finder display unit 107 are provided on the top surface of the image pickup apparatus 100.

The shutter button 101 is an operating portion for performing photographing preparation and issuing a photographing instruction. The power switch 102 is an operating portion that turns on and turns off the power of the image pickup apparatus 100. The mode change-over switch 103 is an operating portion for switching an operation mode of the image pickup apparatus 100 to any one of a still image photographing mode, a moving image photographing mode, and a playback mode. The main electronic dial 104 is a rotary type operating portion for changing setting values such as a shutter speed and an aperture. The sub electronic dial 105 is a rotary type operating portion for performing operations such as moving a selection frame (a cursor) displayed on a display unit 108 disposed on the back surface of the image pickup apparatus 100 and feeding images. The moving image button 106 is an operating portion for issuing instructions to start and stop moving image photographing (moving image recording). The extra-finder display unit 107 is a liquid crystal display device (an LCD) or the like, and displays various kinds of setting values such as the shutter speed and the aperture.

The display unit 108, a touch panel 109, a direction key 110, a SET button 111, an auto exposure lock button (an AE lock button) 112, an AF frame selection/enlargement button 113, a playback button 114, and a menu button 115 are provided on the back surface of the image pickup apparatus 100. In addition, an eyepiece portion 116, an ocular detecting unit 118, a touch bar 119, and a thumb rest portion 121 are provided on the back surface of the image pickup apparatus 100. When viewed from the back surface side, the image pickup apparatus 100 is provided with a grip portion 120 on the right side, a slot lid 123 on the right side surface, and a terminal cover 122 on the left side surface. Furthermore, a lens mount portion (a camera side mount portion) 125 is provided on the front surface of the image pickup apparatus 100, and a communication terminal 124 is provided inside the lens mount portion 125.

The display unit 108 is an LCD, an organic electro-luminescence display device (an organic EL display device), or the like, and displays images and various kinds of information. The touch panel 109 is disposed to overlap a display screen of the display unit 108, and is an operating portion that detects touch operations on the display screen of the display unit 108. By associating input coordinates on the touch panel 109 with coordinates on the display screen of an image displayed on the display unit 108, a graphical user interface (a GUI) as if a user could directly operate the screen displayed on the display unit 108 is configured. The touch detection method on the touch panel 109 may be a publicly known method, and is not limited.

The direction key 110 is an operating portion configured by a key (a four-direction key) that is capable of being pressed in up, down, left, and right directions, respectively, and is able to perform operations such as moving the cursor displayed on the display unit 108 and feeding images in accordance with the direction of the pressed four-direction key. The SET button 111 is an operating portion that is pressed mainly when determining a selected item. The AE lock button 112 is an operating portion that is pressed when fixing an exposure state in a photographing standby state.

The AF frame selection/enlargement button 113 is a shared operating portion that is capable of executing an AF frame selection operation that enables a moving operation in a live view display (an LV display) in the photographing mode and a switching operation to turn an enlargement mode on/off. In the case that the enlargement mode is turned on, it is possible to enlarge or reduce an LV image by operating the main electronic dial 104. It should be noted that the AF frame selection/enlargement button 113 is also used to perform an enlargement display of a playback image in the playback mode and to change an enlargement ratio of the playback image.

The playback button 114 is an operating portion for switching between the photographing mode and the playback mode. In the case that the photographing mode is set, when the playback button 114 is pressed, the mode switches to the playback mode, and the latest photographed image among images recorded on a storage medium 228 (see FIG. 2) is displayed on the display unit 108. The menu button 115 is an operating portion that is pressed when causing the display unit 108 to display a menu screen for performing various kinds of settings. The user is able to intuitively perform various kinds of settings by using the menu screen displayed on the display unit 108, the direction key 110, and the SET button 111.

The eyepiece portion 116 is a portion through which the user is able to look at a look-in type eyepiece finder 117. The user is able to visually confirm a video image displayed on an electronic view finder (an EVF) 217 (see FIG. 2) disposed inside the look-in type eyepiece finder 17 through the eyepiece portion 116. The ocular detecting unit 118 is a sensor that detects whether or not an eye of the user is contacted with the eyepiece portion 116. The touch bar 119 is a linear touch operating portion (a line touch sensor) capable of accepting a touch operation. The touch bar 119 is disposed at a position where the touch operation can be performed by the thumb of the right hand in a state where the user grips the grip portion 120 with (the little finger, the ring finger, and the middle finger) of the right hand so that the user is able to press the shutter button 101 with the index finger of the right hand. Therefore, the user is able to operate the touch bar 119 while holding the image pickup apparatus 100 so that the user is able to press the shutter button 101. The touch bar 119 is capable of accepting a tap operation with respect to the touch bar 119 (an operation involving touching, and then releasing without moving a touch position within a prescribed period of time), leftward and rightward sliding operations (operations involving touching, and then moving the touch position while maintaining the touching), and the like. It should be noted that the touch bar 119 is a multi-function bar that is not equipped with a display function, and functions as, for example, an M-Fn bar.

The grip portion 120 is a grip portion formed in a shape that allows the user to easily grip the image pickup apparatus 100 with the right hand. The shutter button 101 and the main electronic dial 104 are disposed at positions where the shutter button 101 and the main electronic dial 104 can be operated by the index finger of the right hand in a state where the image pickup apparatus 100 is held by the user gripping the grip portion 120 with the little finger, the ring finger, and the middle finger of the right hand. In addition, the sub electronic dial 105 and the touch bar 119 are disposed at positions where the sub electronic dial 105 and the touch bar 119 can be operated by the thumb of the right hand of the user in the state where the image pickup apparatus 100 is held by the user gripping the grip portion 120 with the little finger, the ring finger, and the middle finger of the right hand.

The terminal cover 122 protects a connector (not shown) for connecting the image pickup apparatus 100 to an external device. The slot lid 123 protects the storage medium 228 (see FIG. 2) and a slot (not shown) by closing the slot for storing (housing) the storage medium 228. The lens mount portion 125 is a portion for performing attaching and detaching of a lens unit 200 (see FIG. 2). The communication terminal 124 is a contact terminal that enables communications between the image pickup apparatus 100 and the lens unit 200 in a state where the lens unit 200 is attached to the lens mount portion 125.

Figure 2:
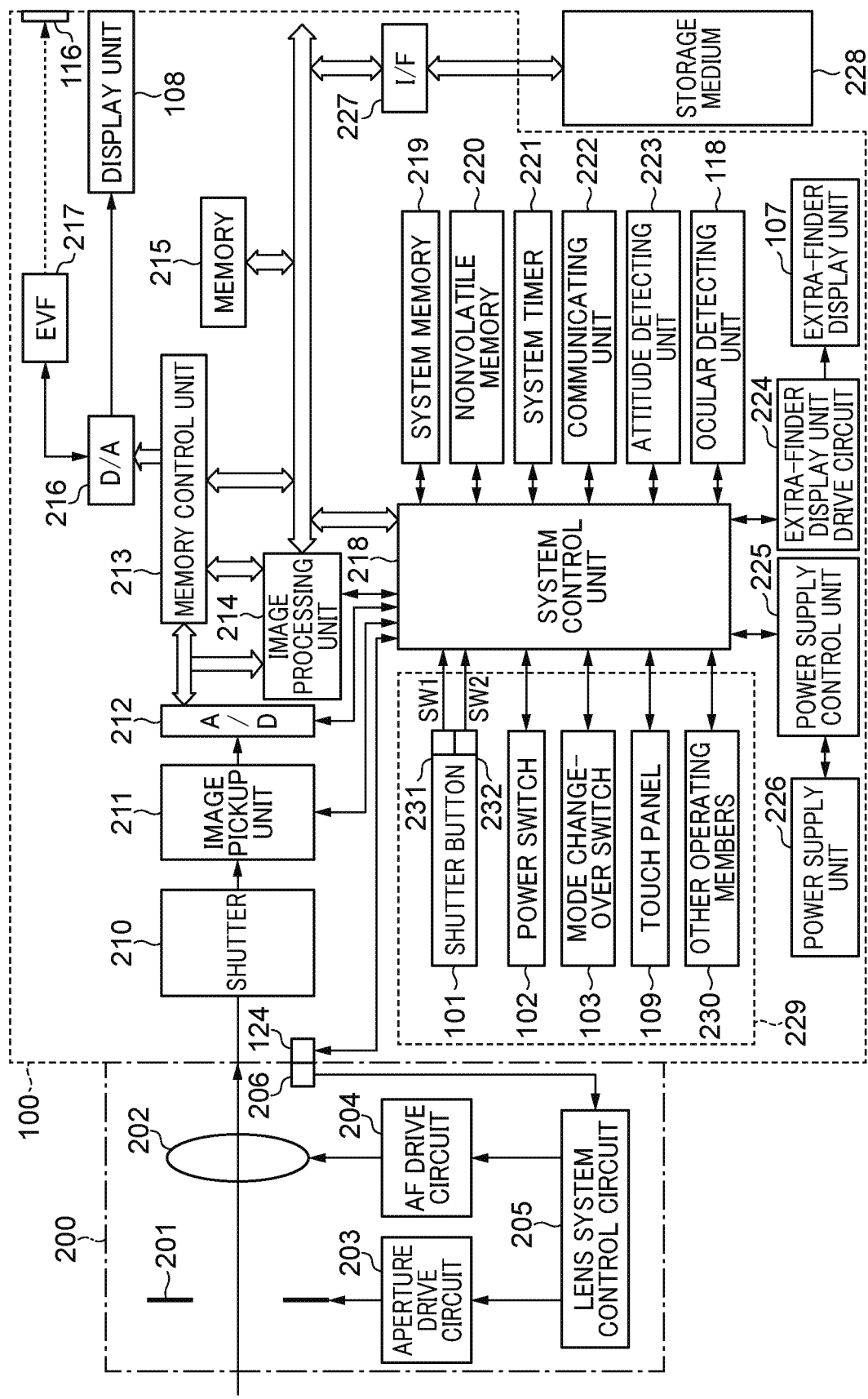
FIG. 2 is a block diagram of an image pickup system in which a lens unit is attached to the image pickup apparatus.

FIG. 2 is a block diagram of an image pickup system in which the lens unit 200 is attached to the image pickup apparatus 100. It should be noted that regarding the image pickup apparatus 100, the same components as those described with reference to FIGS. 1A and 1B are denoted by the same reference numerals, and the description thereof will be omitted as appropriate.

The lens unit 200 is a type of interchangeable lens that can be attached to and detached from the image pickup apparatus 100, and specifically, is a general monocular lens. The lens unit 200 includes an aperture 201, a lens 202, an aperture drive circuit 203, an AF drive circuit 204, a lens system control circuit 205, and a communication terminal 206.

The aperture 201 is a member that adjusts an aperture diameter, and is configured by a plurality of blades. The aperture drive circuit 203 adjusts the amount of incident light from a subject to the image pickup apparatus 100 by controlling the aperture diameter of the aperture 201. Although the lens 202 is schematically represented as one lens in FIG. 2, it is configured by a plurality of lenses. The AF drive circuit 204 drives a focus lens constituting the lens 202 to focus on the subject. The lens system control circuit 205 controls the aperture 201 via the aperture drive circuit 203 and controls a position of the focus lens via the AF drive circuit 204 in accordance with instructions from a system control unit 218 (see FIG. 2) of the image pickup apparatus 100. When the lens unit 200 is attached to the image pickup apparatus 100, the communication terminal 206 is connected to the communication terminal 124 of the image pickup apparatus 100, and enables communications between the lens system control circuit 205 and the system control unit 218 of the image pickup apparatus 100.

The image pickup apparatus 100 includes a shutter 210, an image pickup unit 211, an A/D converter 212, a memory control unit 213, an image processing unit 214, a memory 215, a D/A converter 216, the EVF 217, the eyepiece portion 116, and the display unit 108. In addition, the image pickup apparatus 100 includes the system control unit 218, a system memory 219, a nonvolatile memory 220, a system timer 221, a communicating unit 222, an attitude detecting unit 223, and the ocular detecting unit 118. Furthermore, the image pickup apparatus 100 includes the extra-finder display unit 107, an extra-finder display unit drive circuit 224, a power supply control unit 225, a power supply unit 226, a recording medium I/F 227, and an operating unit 229.

The shutter 210 is a focal plane shutter that controls an exposure time of the image pickup unit 211, and driving of the shutter 210 is controlled by the system control unit 218. The image pickup unit 211 is an image sensor (an image pickup device) such as a CCD image sensor or a CMOS image sensor that includes photoelectric conversion elements that convert an optical image, which is formed on an image pickup surface through the lens unit 200, into electrical signals. It should be noted that in the exemplary embodiment of the disclosure, the image sensor included in the image pickup unit 211 is an image pickup surface phase difference sensor that includes photoelectric conversion elements and outputs information on a defocusing amount to the system control unit 218.

The A/D converter 212 generates image data by converting analog signals outputted from the image pickup unit 211 into image signals consisting of digital signals. The image processing unit 214 performs prescribed processing (for example, a pixel interpolation processing, a resizing processing such as a reducing processing, a color conversion processing, etc.) with respect to the image data outputted from the A/D converter 212 or image data taken out from the memory control unit 213. In addition, the image processing unit 214 performs a prescribed calculating processing with respect to the image data outputted from the A/D converter 212, and based on a calculation result obtained by the image processing unit 214, the system control unit 218 performs exposure control and ranging control (range-finding control). Accordingly, executions of an AF processing, an AE processing, a preliminary light emission before flash processing (an EF processing), etc. in a through the lens system (a TTL system) become possible. Furthermore, the image processing unit 214 performs a prescribed calculating processing with respect to the image data outputted from the A/D converter 212, and performs an automatic white balance processing (an AWB processing) in the TTL system based on the obtained calculation result.

The image data outputted from the A/D converter 212 is written into the memory 215 via the image processing unit 214 and the memory control unit 213. Alternatively, the image data outputted from the A/D converter 212 is written into the memory 215 via the memory control unit 213 without passing through the image processing unit 214. The memory 215 stores the image data outputted from the A/D converter 212, and image data (image data for display) to be displayed on the display unit 108 and the EVF 217. The memory 215 has a sufficient storage capacity for storing a prescribed number of still images and a prescribed time of moving images and audio. In addition, the memory 215 also functions as a memory for image display (a video image memory).

The D/A converter 216 converts the image data for display stored in the memory 215 into analog signals and then supplies the analog signals to the display unit 108 and the EVF 217. That is, the image data for display having been written into the memory 215 is converted into an image and displayed on the display unit 108 and the EVF 217 via the D/A converter 216. Each of the display unit 108 and the EVF 217 is, for example, a display device such as an LCD or an organic EL display device, and performs image display in accordance with the analog signals transmitted from the D/A converter 216. It should be noted that a live view display (an LV display) is performed by converting the image data (the digital signals), which is outputted from the A/D converter 212 and is accumulated in the memory 215, into the analog signals with the D/A converter 216, and sequentially transferring the analog signals to the display unit 108 and the EVF 217 and displaying the analog signals on the display unit 108 and the EVF 217.

The system control unit 218 is a control unit including at least one processor and/or at least one circuit, and is in charge of overall control of the image pickup apparatus 100 (performs the overall control of the image pickup apparatus 100). That is, the system control unit 218 implements respective processes in a flowchart described below by executing a predetermined program stored in the nonvolatile memory 220. In addition, the system control unit 218 performs display control by controlling the memory 215, the D/A converter 216, the display unit 108, and the EVF 217.

The system memory 219 is, for example, a random access memory (a RAM), and the system control unit 218 loads constants and variables that are necessary for operations of the system control unit 218, the program read out from the nonvolatile memory 220, and the like on the system memory 219. The nonvolatile memory 220 is a memory that can be electrically erased and stored, and is, for example, an electrically erasable programmable read-only memory (an EEPROM). The nonvolatile memory 220 stores the constants that are necessary for the operations of the system control unit 218, the program (the program for executing the flowchart described below), etc.

The system timer 221 is a time-measuring unit for measuring a time used in various kinds of controls and measuring a time of a built-in clock. The communicating unit 222 transmits and receives video image signals and audio signals to and from an external device (not shown) connected via wireless communication or by a wired cable. The communicating unit 222 also performs a connection to a wireless local area network (a wireless LAN) or the Internet, and a communication connection to the external device via Bluetooth (registered trademark) or the like. The image pickup apparatus 100 is capable of transmitting photographed images (including LV images) obtained by the image pickup unit 211 and images stored in the storage medium 228 to the external device via the communicating unit 222, and is also capable of receiving various types of data from the external device via the communicating unit 222.

The attitude detecting unit 223 detects an attitude of the image pickup apparatus 100 with respect to a direction of gravitational force. Based on the attitude detected by the attitude detecting unit 223, the system control unit 218 determines whether the photographed image obtained by the image pickup unit 211 is an image photographed while holding the image pickup apparatus 100 horizontally or an image photographed while holding the image pickup apparatus 100 vertically. The system control unit 218 adds orientation information corresponding to the attitude detected by the attitude detecting unit 223 to an image file of the photographed image, and rotates and stores the image. For example, an acceleration sensor, a gyro sensor, or the like is used as the attitude detecting unit 223. It should be noted that by using the attitude detecting unit 223, it is also possible to detect a movement of the image pickup apparatus 100 (panning, tilting, lifting, whether or not it is stationary, etc.).

The ocular detecting unit 118 is a sensor that detects approaching (eye-contacting) and separating (eye-separation) of an object (in most cases, the eye of the user (a photographer)) with respect to the eyepiece portion 116 of the look-in type eyepiece finder 117 with the built-in EVF 217. For example, although an infrared sensor is used as the ocular detecting unit 118, the ocular detecting unit 118 is not limited to the infrared sensor. The infrared sensor determines a distance from the eyepiece portion 116 to the object based on the amount of reflected light received from the object (the eye) of projected infrared light. The ocular detecting unit 118 detects the approaching (the eye-contacting) in the case of detecting an object approaching the eyepiece portion 116 from a non-approaching state (a non-eye-contacting state) within a predetermined distance.

On the other hand, the ocular detecting unit 118 detects the separating (the eye-separation) in the case that the object is separated by the predetermined distance or more from an approaching state (an eye-contacting state). After the approaching (the eye-contacting) has been detected, it is determined that it is in the eye-contacting state until the separating (the eye-separation) is detected. On the other hand, after the separating (the eye-separation) has been detected, it is determined that it is in the non-eye-contacting state until the approaching (the eye-contacting) is detected. It should be noted that for example, a hysteresis may be provided in the process of detecting the approaching (the eye-contacting) and the process of detecting the separating (the eye-separation), so that a threshold value for detecting the eye-contacting and a threshold value for detecting the eye-separation may be made different from each other.

The system control unit 218 switches display/non-display of the display unit 108 and the EVF 217 (switches turning on/turning off the display of the display unit 108 and the EVF 217) in accordance with the state detected by the ocular detecting unit 118 (the detection state obtained by the ocular detecting unit 118). Specifically, in the case that the detection state is the non-eye-contacting state, the display of the display unit 108 is turned on and the display of the EVF 217 is turned off, and on the other hand, in the case that the detection state is the eye-contacting state, the display of the EVF 217 is turned on and the display of the display unit 108 is turned off.

The extra-finder display unit 107 displays various kinds of setting values of the image pickup apparatus 100 such as the shutter speed and the aperture via the extra-finder display unit drive circuit 224. The power supply control unit 225 includes a battery detection circuit (not shown), a DC-DC converter (not shown), a switching circuit (not shown) for switching between blocks to be energized, etc., and performs detection of whether or not a battery has been attached, a type of the battery, a remaining battery level, etc. In addition, the power supply control unit 225 controls the DC-DC converter based on various detection results and an instruction from the system control unit 218 and supplies respective units including the storage medium 228 with a necessary voltage for a necessary period of time. The power supply unit 226 is, for example, a primary battery such as an alkaline battery or a lithium battery, a secondary battery such as a NiCd battery, a NiMH battery, or a lithium-ion battery, an AC adapter, or the like. The recording medium I/F 227 is an interface that enables communications between the storage medium 228 and the system control unit 218. Although a memory card is used as the storage medium 228, the storage medium 228 is not limited to the memory card. The storage medium 228 may be capable of being attached to and being detached from the image pickup apparatus 100, or may be built into the image pickup apparatus 100.

The operating unit 229 is an input unit (an input means) that accepts operations from the user (user operations) and instructs the system control unit 218 to perform various operations and various processes. The operating unit 229 includes the shutter button 101, the power switch 102, the mode change-over switch 103, the touch panel 109, and other operating members 230. The other operating members 230 include the main electronic dial 104, the sub electronic dial 105, the moving image button 106, the direction key 110, the SET button 111, the AE lock button 112, and the AF frame selection/enlargement button 113. In addition, the other operating members 230 include the playback button 114, the menu button 115, and the touch bar 119. Since the other operating members 230 have already been described with reference to FIGS. 1A and 1B, their descriptions will be omitted here.

The shutter button 101 includes a first shutter switch 231 and a second shutter switch 232. The first shutter switch 231 is turned on in the middle of an operation of the shutter button 101 (by a so-called half-pressing), and generates a first shutter signal SW1 that instructs the system control unit 218 to perform the photographing preparation. Upon receiving the first shutter signal SW1, the system control unit 218 starts photographing preparation processing such as the AF processing, the AE processing, the AWB processing, the EF processing, etc. The second shutter switch 232 is turned on when the operation of the shutter button 101 is completed (by a so-called full-pressing), and generates a second shutter signal SW2 that instructs the system control unit 218 to perform a photographing operation. Upon receiving the second shutter signal SW2, the system control unit 218 executes a series of photographing processing from reading out signals from the image pickup unit 211 to storing the photographed image in the storage medium 228.

Figure 3:
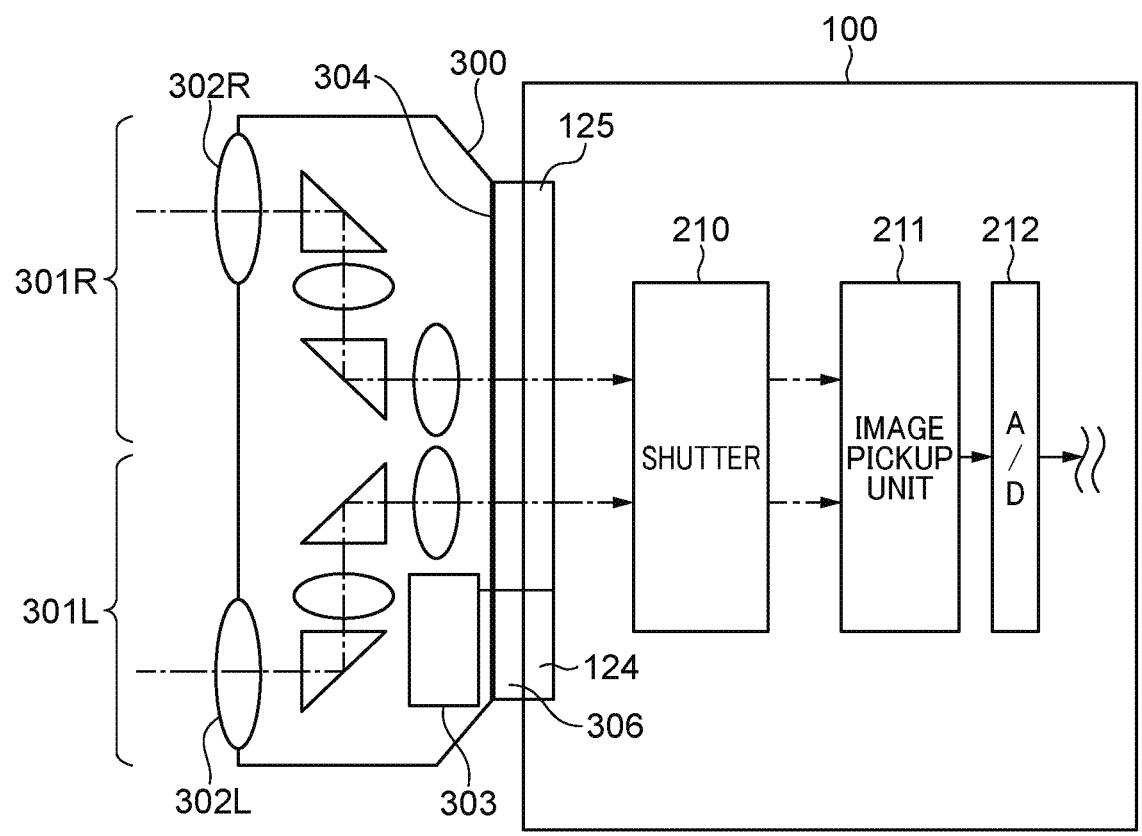
FIG. 3 is a diagram that shows a schematic configuration of a binocular lens unit.

FIG. 3 is a diagram that shows an example of a schematic configuration of a binocular lens unit 300, and simply shows a state in which the binocular lens unit 300 is attached to the image pickup apparatus 100. The binocular lens unit 300 is one of the interchangeable lenses that can be attached to and detached from the lens mount portion 125 of the image pickup apparatus 100.

The binocular lens unit 300 is attached to the image pickup apparatus 100 by bayonet coupling between a camera mount portion (a lens side mount portion) 304, and the lens mount portion 125 of the image pickup apparatus 100 or the like. When the binocular lens unit 300 is attached to the image pickup apparatus 100, the system control unit 218 and a lens system control circuit 303 are electrically connected to each other via the communication terminal 124 of the image pickup apparatus 100 and a communication terminal 306 of the binocular lens unit 300.

The binocular lens unit 300 includes a right eye optical system 301R (a first optical system) including a plurality of lenses, a reflecting mirror, etc., a left eye optical system 301L (a second optical system) including a plurality of lenses, a reflecting mirror, etc., and the lens system control circuit 303.

The right eye optical system 301R and the left eye optical system 301L include a lens 302R and a lens 302L, respectively, which are arranged on the subject side so that their optical axes are substantially parallel to each other. The lens 302R and the lens 302L are fisheye lenses that are capable of capturing a range of approximately 180 degrees. The right eye optical system 301R obtains a front hemisphere range of 180 degrees in a left-right direction (a horizontal angle, an azimuth angle, a yaw angle) as a right image (a first image) with parallax. In addition, the left eye optical system 301L obtains a front hemisphere range of approximately 180 degrees in a vertical direction (a vertical angle, an elevation angle or a depression angle, a pitch angle) as a left image (a second image) with parallax. In other words, the binocular lens unit 300 is configured to be a lens unit that is capable of performing photographing in accordance with a standard specification for stereoscopic 180-degree VR moving image (in accordance with so-called VR180), which is a VR image format that allows binocular stereoscopic viewing. The lens 302R and the lens 302L form the right image formed via the right eye optical system 301R and the left image, which has parallax with respect to the right image and is formed via the left eye optical system 301L, on one or two image pickup devices of the image pickup apparatus to which the lens unit 200 is attached.

It should be noted that the right eye optical system 301R and the left eye optical system 301L is to obtain video images that can be displayed in two-eye VR as the VR180, respectively. Therefore, the lens 302R and the lens 302L may be lenses that are capable of capturing a wide viewing angle range (for example, a range of about 160 degrees) that is narrower than a range of 180 degrees.

The binocular lens unit 300 includes a first focus ring (not shown) that performs focus adjustment of the right image formed via the right eye optical system 301R, and a second focus ring (not shown) that performs focus adjustment of the left image formed via the left eye optical system 301L. It should be noted that the binocular lens unit 300 is not limited to such a configuration, and may include, for example, a focus ring that simultaneously performs focus adjustment of the right image and the left image, and a focus ring that performs focus adjustment of either the right image or the left image.

In the exemplary embodiment of the disclosure, the right image and the left image are formed side by side on the image pickup unit 211 (the image pickup device). That is, by forming two optical images (two subject images) on one image pickup device by the right eye optical system 301R and the left eye optical system 301L, it is possible to obtain two images with parallax simultaneously (in a set). Furthermore, by setting the two images with parallax obtained to an image for the left eye and an image for the right eye and displaying them in VR, it becomes possible for the user to view a three-dimensional VR image (so-called VR180) with a range of approximately 180 degrees.

Figure 4:
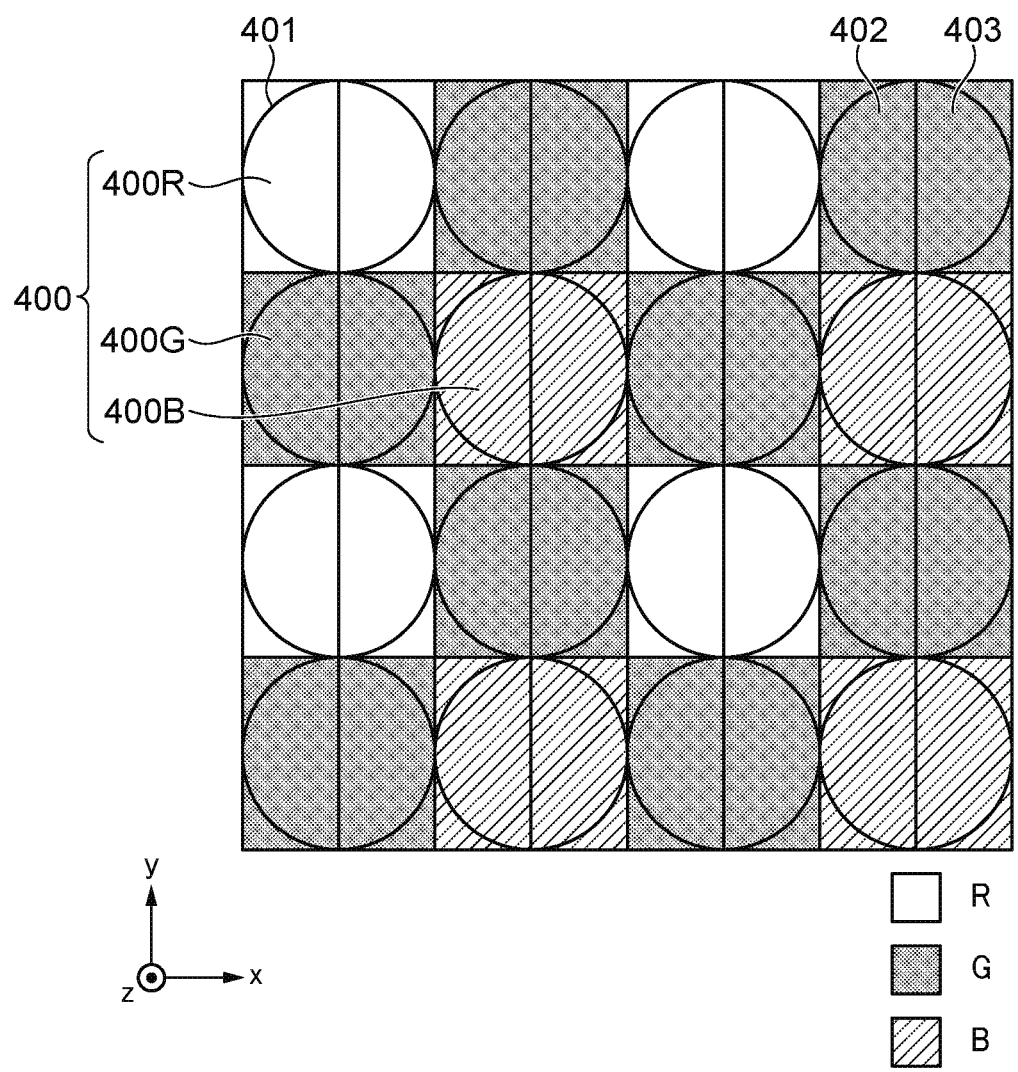
FIG. 4 is a front view that shows an example of a pixel arrangement of an image pickup device included in an image pickup unit.

FIG. 4 is a front view that shows an example of a pixel arrangement of the image pickup device included in the image pickup unit 211. A part of image pickup pixels of the image pickup device, specifically, a range of 4 columns×4 rows of image pickup pixels of a two-dimensional CMOS image sensor (a range of 8 columns×4 rows as an arrangement of focus detection pixels) is cut out and is shown in FIG. 4. It should be noted that in the case that a y direction shown in FIG. 4 is parallel to the vertical direction, an x direction shown in FIG. 4 and a z direction shown in FIG. 4 are parallel to a horizontal direction and the z direction becomes a front-back direction of the image pickup apparatus 100.

It is assumed that a pixel group 400 is composed of pixels arranged in two columns and two rows, and is covered with a Bayer array color filter. In the pixel group 400, a pixel 400R having a spectral sensitivity of R (red) is arranged at the upper left position, two pixels 400G having a spectral sensitivity of G (green) are arranged at the upper right position and the lower left position, respectively, and a pixel 400B having a spectral sensitivity of B (blue) is arranged at the lower right position. In the image pickup device, each pixel has a plurality of photodiodes (PDs), which are photoelectric conversion units, for one microlens 401 so that focus detection using an image pickup surface phase difference method can be performed. In the exemplary embodiment of the disclosure, it is assumed that each pixel is configured by two PDs 402 and 403 arranged in two columns and one row.

The image pickup device of the image pickup unit 211 is configured with a large number of the pixel groups 400 each consisting of pixels of 2 columns×2 rows shown in FIG. 4 (the pixel groups 400 each consisting of PDs of 4 columns×2 rows) arranged on the image pickup surface (is configured with the pixel groups 400 repeatedly arranged in the x direction and the y direction), and obtains image pickup signals and focusing signals. In each pixel of the image pickup device, a light flux is separated by the microlens 401 and forms images on the PDs 402 and 403. In other words, respective light fluxes, which have passed through different regions of an exit pupil of an image pickup optical system, form the images on the PDs 402 and 403. A signal obtained by adding signals outputted from the PDs 402 and 403 (an A-image signal+a B-image signal) is used as the image pickup signal, and two signals read out from the PDs 402 and 403, respectively, (the A-image signal and the B-image signal) are used as the focusing signals.

It should be noted that the image pickup signals and the focusing signals may be read out separately, but in consideration of the processing load, the following method may be used. That is, by reading out the image pickup signal (the A-image signal+the B-image signal) and one focusing signal of the PDs 402 and 403 (for example, the A-image signal) and taking the difference, the other focusing signal of the PDs 402 and 403 (for example, the B-image signal) may be obtained. In addition, in the exemplary embodiment of the disclosure, although each pixel has the two PDs 402 and 403 for one microlens 401, the number of the PDs is not limited to two and may be three or more. Furthermore, a plurality of pixels having different aperture positions of light receiving portions with respect to the microlens 401 may be provided. In other words, any configuration is sufficient as long as at least two signals that enable phase difference detection such as the A-image signal and the B-image signal are obtained as a result. Moreover, in the exemplary embodiment of the disclosure, although the configuration in which each pixel has a plurality of the PDs is adopted, the configuration is not limited to this configuration, and a configuration may be adopted in which the focus detection pixels are discretely provided within normal pixels that constitutes the image pickup device.

Figure 5:
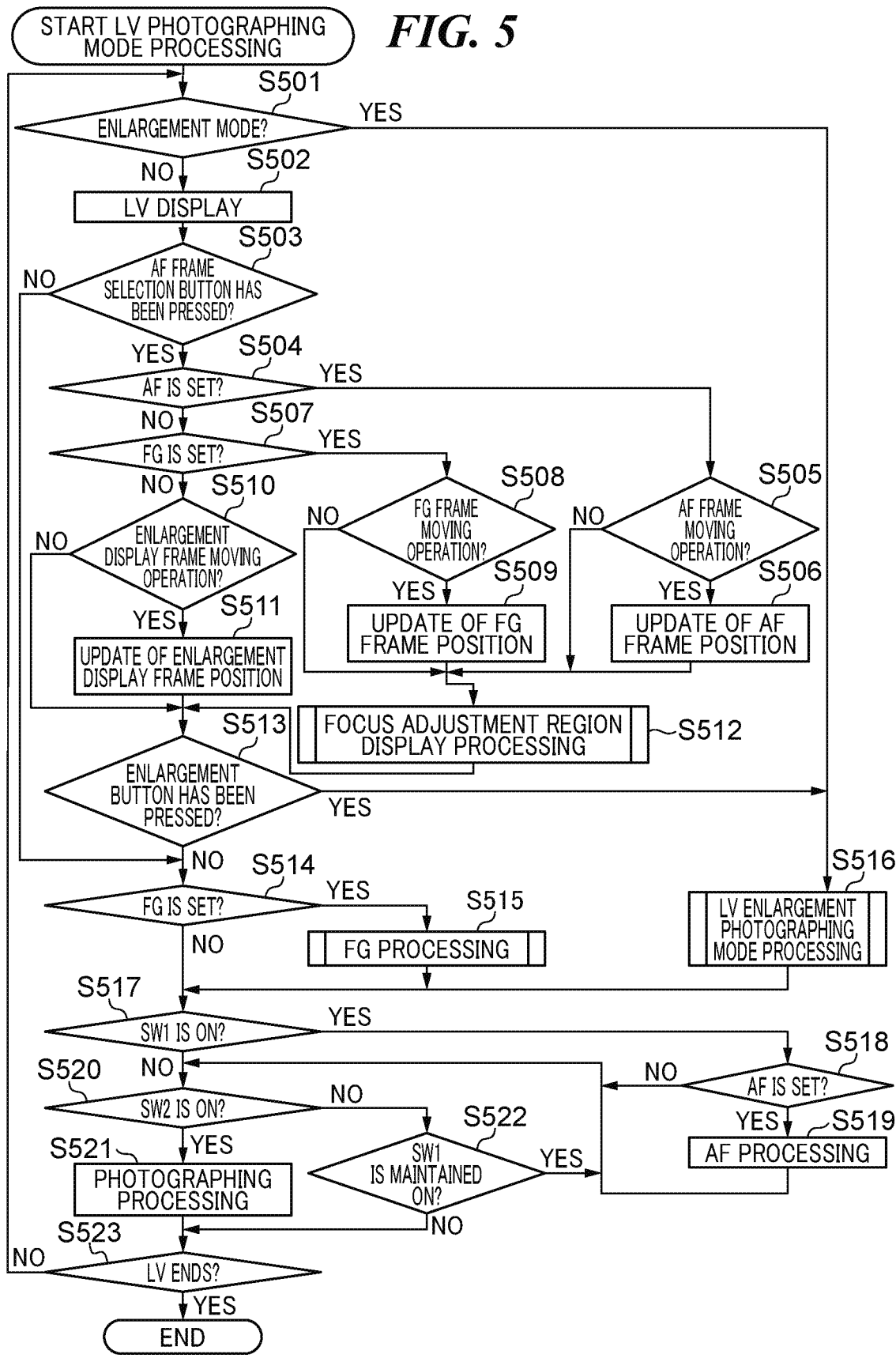
FIG. 5 is a flowchart of a live view photographing mode processing executed by the image pickup apparatus.

FIG. 5 is a flowchart of a live view photographing mode processing (an LV photographing mode processing) executed in the state where the lens unit 200 is attached to the image pickup apparatus 100. Each process (each step) indicated by an S number in the flowchart of FIG. 5 is realized by the system control unit 218 loading the program stored in the nonvolatile memory 220 into the system memory 219 and comprehensively controlling the operations of respective units (respective components) of the image pickup apparatus 100. When the power switch 102 of the image pickup apparatus 100 is turned on and an LV photographing mode is set, the process of S501 is started.

In S501, the system control unit 218 determines whether or not an LV display mode is the enlargement mode. It should be noted that whether or not the LV display mode is the enlargement mode is stored in the nonvolatile memory 220. In the case of determining that the LV display mode is the enlargement mode (YES in S501), the system control unit 218 executes the process of S516. On the other hand, in the case of determining that the LV display mode is not the enlargement mode (NO in S501) (specifically, the LV display mode is an unmagnification mode), the system control unit 218 executes the process of S502.

In S502, the system control unit 218 performs an LV display on the display unit 108. The system control unit 218 displays an LV image as a photographing standby image on the display unit 108, and also displays various kinds of information. The LV display at this time is an unmagnification display in which the entire LV image, that is, the entire range of an image pickup angle of view (an image outputted from the entire image pickup region of the image pickup device) is displayed so as to fit onto the display unit 108. At this time, if a focus mode is set to an autofocus mode (an AF mode), an autofocus frame (hereinafter, referred to as "an AF frame") is displayed on the LV image. In the case that the focus mode is set to a manual focus mode (an MF mode) and a focus guide is set, a focus guide frame (hereinafter, referred to as "an FG frame") indicating a target region for focus adjustment is displayed on the LV image. However, in the case that the MF mode is set and the focus guide is not set, the FG frame will not be displayed on the LV image.

In S503, the system control unit 218 determines whether or not the AF frame selection/enlargement button 113 has been pressed (has been operated). It should be noted that it is assumed that an AF frame selection function is enabled. In the case of determining that the AF frame selection/enlargement button 113 has been pressed (YES in S503), the system control unit 218 executes the process of S504. On the other hand, in the case of determining that the AF frame selection/enlargement button 113 has not been pressed (NO in S503), the system control unit 218 executes the process of S514.

In S504, the system control unit 218 determines whether or not the focus mode is set to the AF mode. In the case of determining that the focus mode is set to the AF mode (YES in S504), the system control unit 218 executes the process of S505. On the other hand, in the case of determining that the focus mode is not set to the AF mode (NO in S504) (the focus mode is set to the MF mode), the system control unit 218 executes the process of S507.

In S505, the system control unit 218 determines whether or not there has been an operation to move the AF frame (an AF frame moving operation). The AF frame moving operation is capable of being performed by a series of operations (dragging) including touch down (touch on), touch move, and touch up on the display unit 108 (the touch panel 109). It should be noted that the AF frame moving operation may be performed by using the direction key 110. In the case of determining that there has been the AF frame moving operation (YES in S505), the system control unit 218 executes the process of S506. On the other hand, in the case of determining that there has not been the AF frame moving operation (NO in S505), the system control unit 218 executes the process of S512.

In S506, the system control unit 218 moves a display position of the AF frame according to the AF frame moving operation determined in S505, and then executes the process of S512.

In S507, the system control unit 218 determines whether or not the focus guide is set. In the case of determining that the focus guide is set (YES in S507), the system control unit 218 executes the process of S508. On the other hand, in the case of determining that the focus guide is not set (NO in S507), the system control unit 218 executes the process of S510.

In S508, the system control unit 218 determines whether or not there has been an operation to move the FG frame (an FG frame moving operation). The FG frame moving operation is capable of being performed in the same manner as the AF frame moving operation. In the case of determining that there has been the FG frame moving operation (YES in S508), the system control unit 218 executes the process of S509. On the other hand, in the case of determining that there has not been the FG frame moving operation (NO in S508), the system control unit 218 executes the process of S512.

In S509, the system control unit 218 moves a display position of the FG frame according to the FG frame moving operation determined in S508, and then executes the process of S512.

In S510, the system control unit 218 determines whether or not there has been an operation to move an enlargement display frame (an enlargement display frame moving operation). It should be noted that, although as will be described below with reference to FIG. 7, in the case that the MF mode is set and the unmagnification mode is set, the enlargement display frame is displayed on the display unit 108 so as to be superimposed on the LV image. In addition, since the AF frame, the FG frame, and the enlargement display frame are in a frame selectable state by S503, their positions can be changed in accordance with the operation of the direction key 110 or the touch operation of the touch panel 109. In the case of determining that there has been the enlargement display frame moving operation (YES in S510), the system control unit 218 executes the process of S511. On the other hand, in the case of determining that there has not been the enlargement display frame moving operation (NO in S510), the system control unit 218 executes the process of S513.

In S511, the system control unit 218 moves a display position of the enlargement display frame according to the enlargement display frame moving operation determined in S510, and then executes the process of S513.

In S512, the system control unit 218 performs a focus adjustment region display processing, and then executes the process of S513. Details of the focus adjustment region display processing performed in S512 will be described below with reference to a flowchart of FIG. 8.

In S513, the system control unit 218 determines whether or not the AF frame selection/enlargement button 113 has been pressed (has been operated). Here, as the result of the determination in S503, various frames are capable of being selected and an enlargement function is enabled. In the case of determining that the AF frame selection/enlargement button 113 has not been pressed (NO in S513), the system control unit 218 executes the process of S514. On the other hand, in the case of determining that the AF frame selection/enlargement button 113 has been pressed (YES in S513), the system control unit 218 executes the process of S516.

In S514, the system control unit 218 determines whether or not the focus guide is set. It should be noted that the focus guide is capable of being set only in the case of the MF mode. Therefore, in the case of determining that the focus guide is set in the MF mode (YES in S514), the system control unit 218 executes the process of S515, and on the other hand, in the case of determining that the focus guide is not set (NO in S514), the system control unit 218 executes the process of S517.

In S515, the system control unit 218 performs a focus guide processing (an FG processing), and then executes the process of S517. It should be noted that details of the FG processing performed in S515 will be described below with reference to a flowchart of FIG. 10.

In S516, the system control unit 218 performs an LV enlargement photographing mode processing, and then executes the process of S517. It should be noted that details of the LV enlargement photographing mode processing performed in S516 will be described below with reference to a flowchart of FIG. 6.

In S517, the system control unit 218 determines whether or not the first shutter signal SW1 of the shutter button 101 is turned on. In the case of determining that the first shutter signal SW1 is turned on (YES in S517), the system control unit 218 executes the process of S518. On the other hand, in the case of determining that the first shutter signal SW1 is not turned on (NO in S517), the system control unit 218 executes the process of S520.

In S518, the system control unit 218 determines whether or not the focus mode is set to the AF mode. In the case of determining that the focus mode is set to the AF mode (YES in S518), the system control unit 218 executes the process of S519. On the other hand, in the case of determining that the focus mode is not set to the AF mode (NO in S518) (the focus mode is set to the MF mode), the system control unit 218 executes the process of S520.

In S519, the system control unit 218 performs an AF processing based on the position of the AF frame, and then executes the process of S520.

In S520, the system control unit 218 determines whether or not the shutter button 101 has been fully pressed and the second shutter signal SW2 is turned on. In the case of determining that the second shutter signal SW2 is turned on (YES in S520), the system control unit 218 executes the process of S521. On the other hand, in the case of determining that the second shutter signal SW2 is not turned on (NO in S520), the system control unit 218 executes the process of S522.

In S521, the system control unit 218 performs a series of photographing processing from image pickup performed by the image pickup unit 211 to storing photographed image data in the storage medium 228, and then executes the process of S523.

In S522, the system control unit 218 determines whether or not the first shutter signal SW1 is maintained in the on state. In the case of determining that the first shutter signal SW1 is maintained in the on state (YES in S522), the system control unit 218 executes the process of S520. On the other hand, in the case of determining that the first shutter signal SW1 is turned off (NO in S522), the system control unit 218 executes the process of S523.

In S523, the system control unit 218 determines whether or not there has been an event to end the LV photographing mode (an end event of the LV photographing mode). Examples of the end event include an operation to turn off the power of the image pickup apparatus 100, an instruction to switch to the operation mode other than the LV photographing mode (for example, the playback mode or the like), etc. In the case of determining that there has not been the end event (NO in S523), the system control unit 218 executes the process of S501. On the other hand, in the case of determining that there has been the end event (YES in S523), the system control unit 218 ends the LV photographing mode processing.

Figure 6:
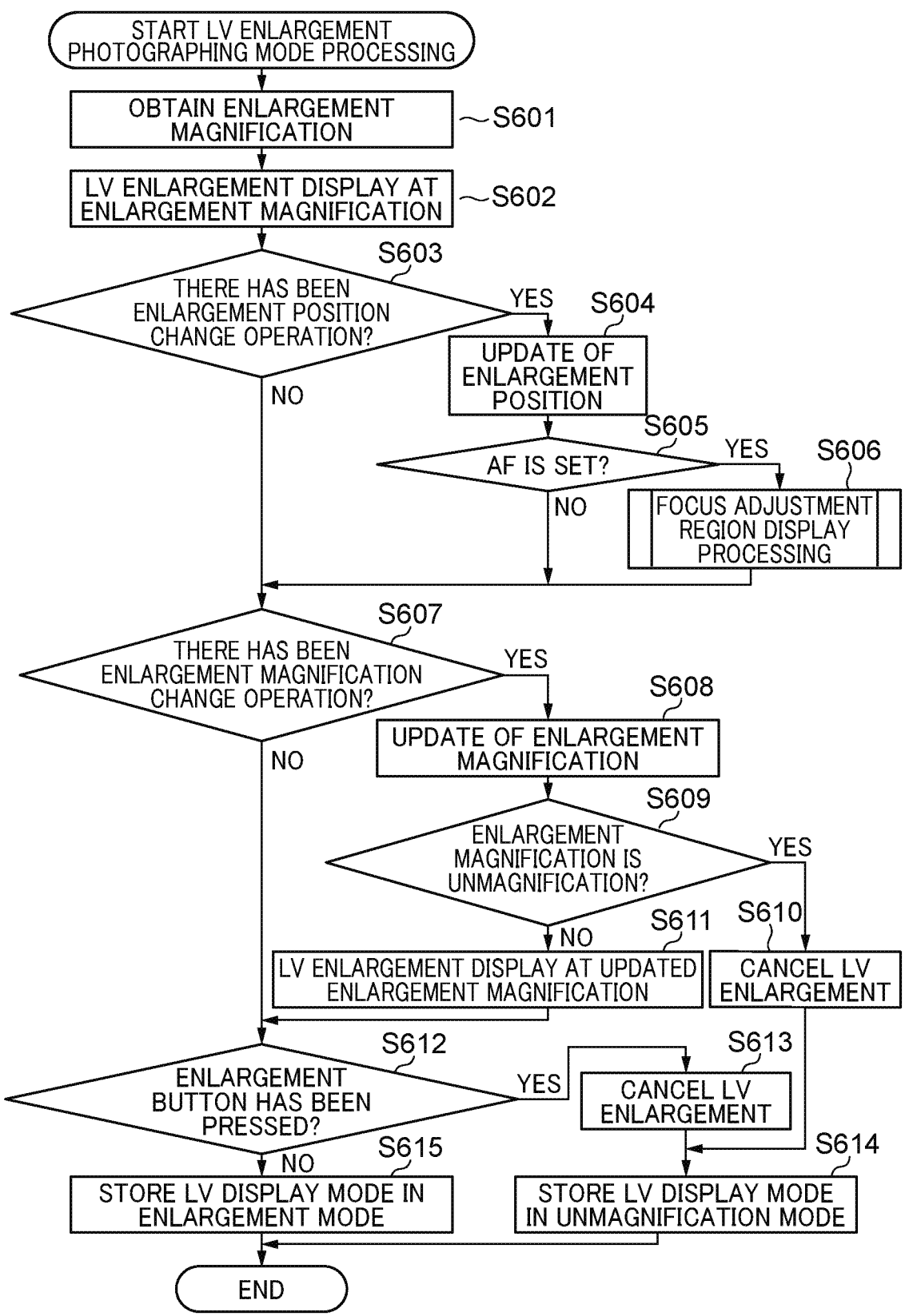
FIG. 6 is a flowchart of an LV enlargement photographing mode processing executed in S516.
Figure 7:
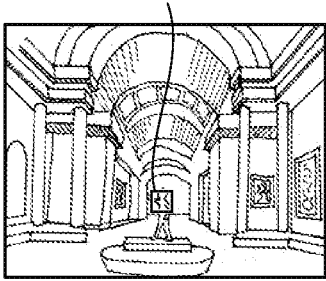
FIG. 7 is a diagram that shows display examples of a focus adjustment region and an enlargement display region when performing an unmagnification display/an enlargement display of an LV image.
Figure 7:
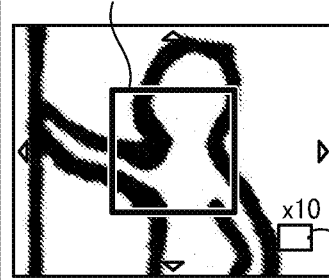
Figure 7:
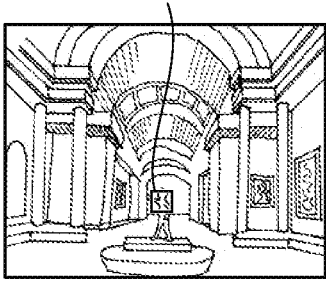
Figure 7:
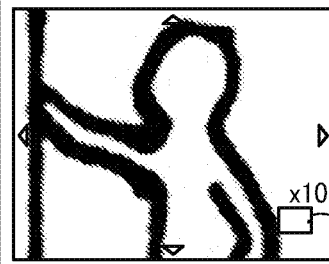

FIG. 6 is the flowchart of the LV enlargement photographing mode processing executed in S516. FIG. 7 is a diagram that shows display examples of a focus adjustment region and an enlargement display region when performing the unmagnification display/the enlargement display of the LV image in AF setting/MF setting. In FIG. 7, (A) is a diagram that shows examples of the unmagnification display and the enlargement display of the LV image in the case that the focus mode is the AF mode. An AF frame 703 is displayed on an LV image 700 with the unmagnification display. In addition, an AF frame 704 corresponding to the AF frame 703 is displayed at the center of an LV image 701 with the enlargement display, and an indicator 702 indicating an enlargement range is displayed at the lower right of the LV image 701 with the enlargement display. In FIG. 7, (B) is a diagram that shows examples of the unmagnification display and the enlargement display of the LV image in the case that the focus mode is the MF mode. An enlargement display frame 705 is displayed on the LV image 700 with the unmagnification display. Although the indicator 702 indicating the enlargement range is displayed at the lower right of the LV image 701 with the enlargement display, an enlargement display frame corresponding to the enlargement display frame 705 is not displayed.

In S601, the system control unit 218 obtains an LV enlargement magnification (an enlargement magnification) stored in the nonvolatile memory 220. In S602, the system control unit 218 performs an LV enlargement display (the enlargement display) at the enlargement magnification obtained in S601. In S603, the system control unit 218 determines whether or not there has been an operation to change an enlargement position (an enlargement position change operation). It should be noted that the enlargement position change operation is capable of being performed by operating the direction key 110. In the case of determining that there has been the enlargement position change operation (YES in S603), the system control unit 218 executes the process of 604. On the other hand, in the case of determining that there has not been the enlargement position change operation (NO in S603), the system control unit 218 executes the process of S607.

In S604, the system control unit 218 updates the enlargement position stored in the nonvolatile memory 220 to a new enlargement position in response to the enlargement position change operation accepted in S603. In S605, the system control unit 218 determines whether or not the focus mode is set to the AF mode. In the case of determining that the focus mode is set to the AF mode (YES in S605), the system control unit 218 executes the process of S606. On the other hand, in the case of determining that the focus mode is not set to the AF mode (NO in S605) (the focus mode is set to the MF mode), the system control unit 218 executes the process of S607.

In S606, the system control unit 218 performs the focus adjustment region display processing, and then executes the process of S607. It should be noted that the details of the focus adjustment region display processing performed in S606 will be described below. In S607, the system control unit 218 determines whether or not there has been an operation to change the enlargement magnification (an enlargement magnification change operation). The enlargement magnification change operation is capable of being performed by a rotating operation of the main electronic dial 104. In the case of determining that there has been the enlargement magnification change operation (YES in S607), the system control unit 218 executes the process of 608. On the other hand, in the case of determining that there has not been the enlargement magnification change operation (NO in S607), the system control unit 218 executes the process of S612.

In S608, the system control unit 218 updates the enlargement magnification stored in the nonvolatile memory 220 to a new enlargement magnification in response to the enlargement magnification change operation accepted in S607. For example, in the case that a change in the enlargement magnification is instructed by a rotating operation of the main electronic dial 104 in the forward direction (clockwise), for each command, the enlargement magnification is changed from 1 time to 5 times, from 5 times to 10 times, and from 10 times to 1 time, and the enlargement magnification stored in the nonvolatile memory 220 is updated.

In S609, the system control unit 218 determines whether or not the updated enlargement magnification is unmagnification (the updated enlargement magnification is 1 time), that is, determines whether or not to return to the unmagnification display. In the case of determining that the updated enlargement magnification is unmagnification (the updated enlargement magnification is 1 time) (YES in S609), the system control unit 218 executes the process of 610. On the other hand, in the case of determining that the updated enlargement magnification is not unmagnification (the updated enlargement magnification is not 1 time) (NO in S609) (in the exemplary embodiment of the disclosure, the updated enlargement magnification is 5 times or 10 times), the system control unit 218 executes the process of S611.

In S610, the system control unit 218 cancels the enlargement display of the LV image, displays the LV image at the unmagnification display, and then executes the process of S614. In S611, the system control unit 218 performs the enlargement display of the LV image based on the updated enlargement magnification, and then executes the process of S612.

In S612, the system control unit 218 determines whether or not the AF frame selection/enlargement button 113 has been pressed. This operation becomes an instruction to cancel the enlargement display. In the case of determining that the AF frame selection/enlargement button 113 has been pressed (YES in S612), the system control unit 218 executes the process of S613. On the other hand, in the case of determining that the AF frame selection/enlargement button 113 has not been pressed (NO in S612), the system control unit 218 executes the process of S615.

In S613, since the system control unit 218 determines that the instruction to cancel the enlargement display has been received in S612, the system control unit 218 cancels the enlargement display of the LV image, performs the unmagnification display of the LV image, and then executes the process of S614.

In S614, the system control unit 218 changes the LV display mode of the nonvolatile memory 220 to the unmagnification mode and stores it, and then ends the LV enlargement photographing mode processing. In S615, the system control unit 218 changes the LV display mode of the nonvolatile memory 220 to the enlargement mode and stores it (stores the LV display mode of the nonvolatile memory

220 in the enlargement mode), and then ends the LV enlargement photographing mode processing. It should be noted that the LV display mode stored in the nonvolatile memory 220 is used to determine whether or not the LV display mode is the enlargement mode in S501.

Figure 8:
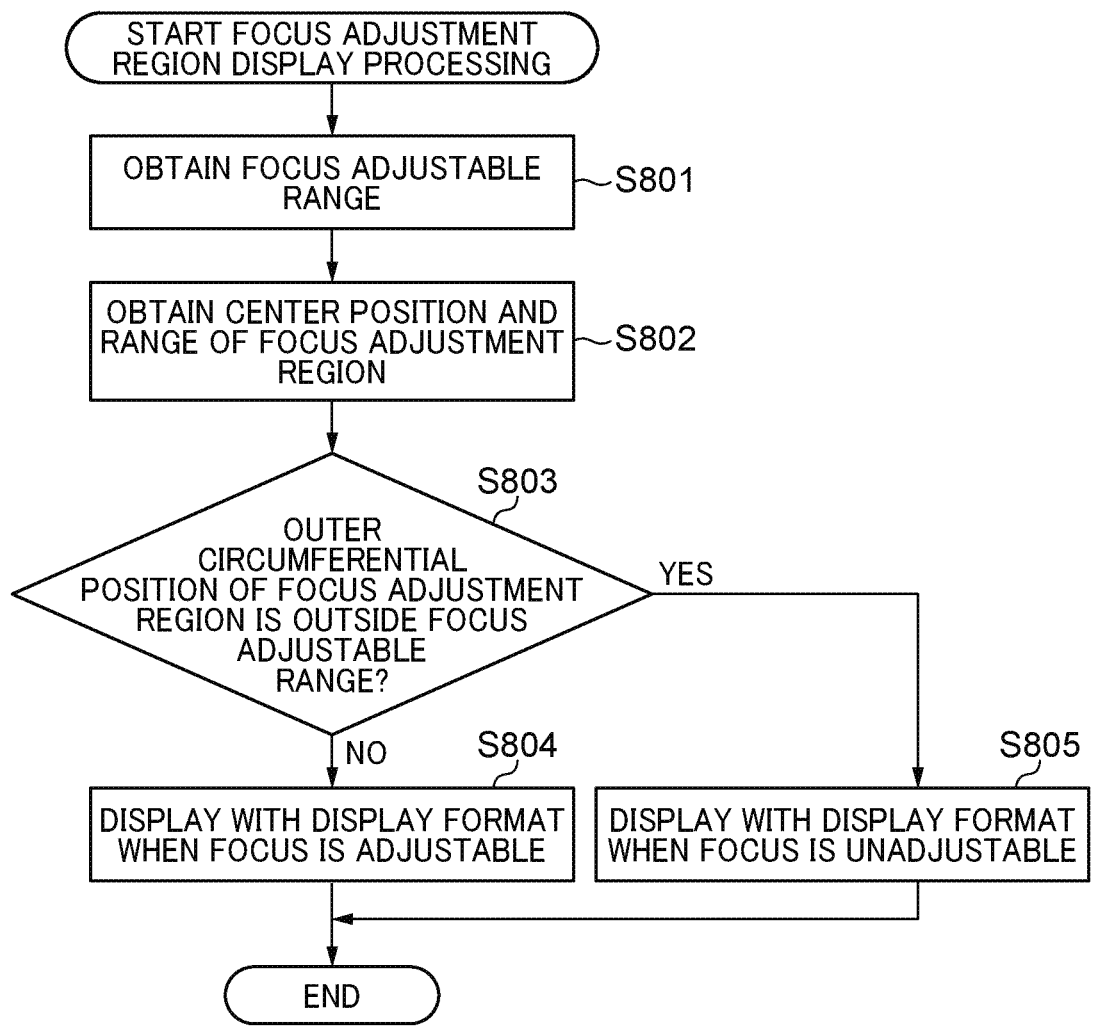
FIG. 8 is a flowchart of a focus adjustment region display processing executed in S512 and S606.

FIG. 8 is the flowchart of the focus adjustment region display processing executed in S512 of FIG. 5 and S606 of FIG. 6. Here, the case will be described in which the image pickup system is configured by attaching the lens unit 200 to the image pickup apparatus 100, but similar processing is performed in the case that the binocular lens unit 300 is attached to the image pickup apparatus 100.

In S801, the system control unit 218 obtains a focus adjustable range from the lens system control circuit 205 via the communication terminal 206 of the lens unit 200 and the communication terminal 124 of the image pickup apparatus 100. It should be noted that, in the case that identification information about the lens unit 200, information about the focus adjustable range, and optical information for calculating the focus adjustable range are stored in the nonvolatile memory 220, the system control unit 218 may obtain the focus adjustable range from the identification information about the lens unit 200, the information about the focus adjustable range, and the optical information for calculating the focus adjustable range.

In step S802, the system control unit 218 obtains a center position and a range of the focus adjustment region, which is currently set in the image pickup region of the image pickup device, from the nonvolatile memory 220. In the case that the AF mode is set, the focus adjustment region is a region indicated by the AF frame, and in the case that the MF mode is set, the focus adjustment region is a region indicated by the FG frame. In S803, the system control unit 218 determines whether or not an outer circumferential position, which is calculated from the center position and the range of the focus adjustment region that are obtained in S802, is outside the focus adjustable range obtained in S801. Here, the process of S803 will be specifically described with reference to FIGS. 9A and 9B.

Figure 9A:
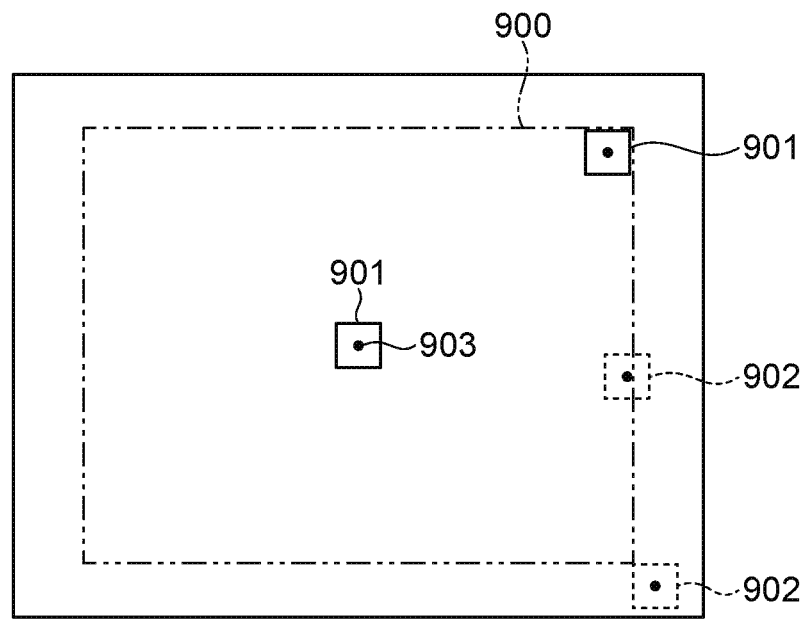
FIGS. 9A and 9B are diagrams that show a relationship between the focus adjustment region, its center position, and a focus adjustable range.
Figure 9B:
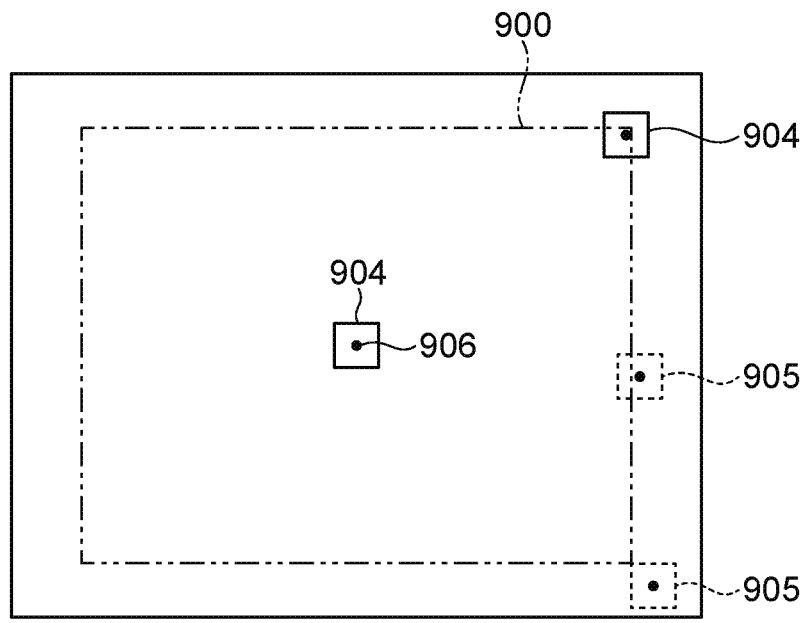

FIGS. 9A and 9B are diagrams that show a relationship between the center position and the range of the focus adjustment region, and the focus adjustable range. FIG. 9A is a schematic diagram that shows an example in which the determination result is true and an example in which the determination result is false when determining whether or not an outer circumference of the focus adjustment region is outside the focus adjustable range.

In FIG. 9A, since an outer circumference of a focus adjustment region 901 centered on a center position 903 is inside a focus adjustable range 900, the determination in S803 becomes false (NO). On the other hand, since at least a portion of an outer circumference of a focus adjustment region 902 is outside the focus adjustable range 900, the determination in S803 becomes true (YES).

In the case of determining that the outer circumference of the focus adjustment region is not outside the focus adjustable range (NO in S803), the system control unit 218 executes the process of S804. On the other hand, in the case of determining that the outer circumference of the focus adjustment region is outside the focus adjustable range (YES in S803), the system control unit 218 executes the process of S805.

It should be noted that, in S803, the system control unit 218 may determine whether or not the center position of the focus adjustment region obtained in S802 is outside the focus adjustable range obtained in S801. FIG. 9B is a schematic diagram that shows an example in which the determination result is true and an example in which the determination result is false when determining whether or not the center position of the focus adjustment region is outside the focus adjustable range. In FIG. 9B, since a center position 906 of a focus adjustment region 904 is inside the focus adjustable range 900, the determination in S803 becomes false (NO). On the other hand, since a center position of a focus adjustment region 905 is outside the focus adjustable range 900, the determination in S803 becomes true (YES).

In S804, since the focus adjustment region is located at a position where the focus adjustment is possible (a position where the focus is adjustable), the system control unit 218 performs a display in a focus-adjustable display format, and thereby ends the focus adjustment region display processing. In S805, since the focus adjustment region is located at a position where the focus adjustment is not possible (a position where the focus is unadjustable), the system control unit 218 performs a display in a focus-unadjustable display format, and thereby ends the focus adjustment region display processing. It should be noted that specific examples of the focus-adjustable display format in S804 and the focus-unadjustable display format in S805 will be described below with reference to FIG. 12 and the like.

Figure 10:
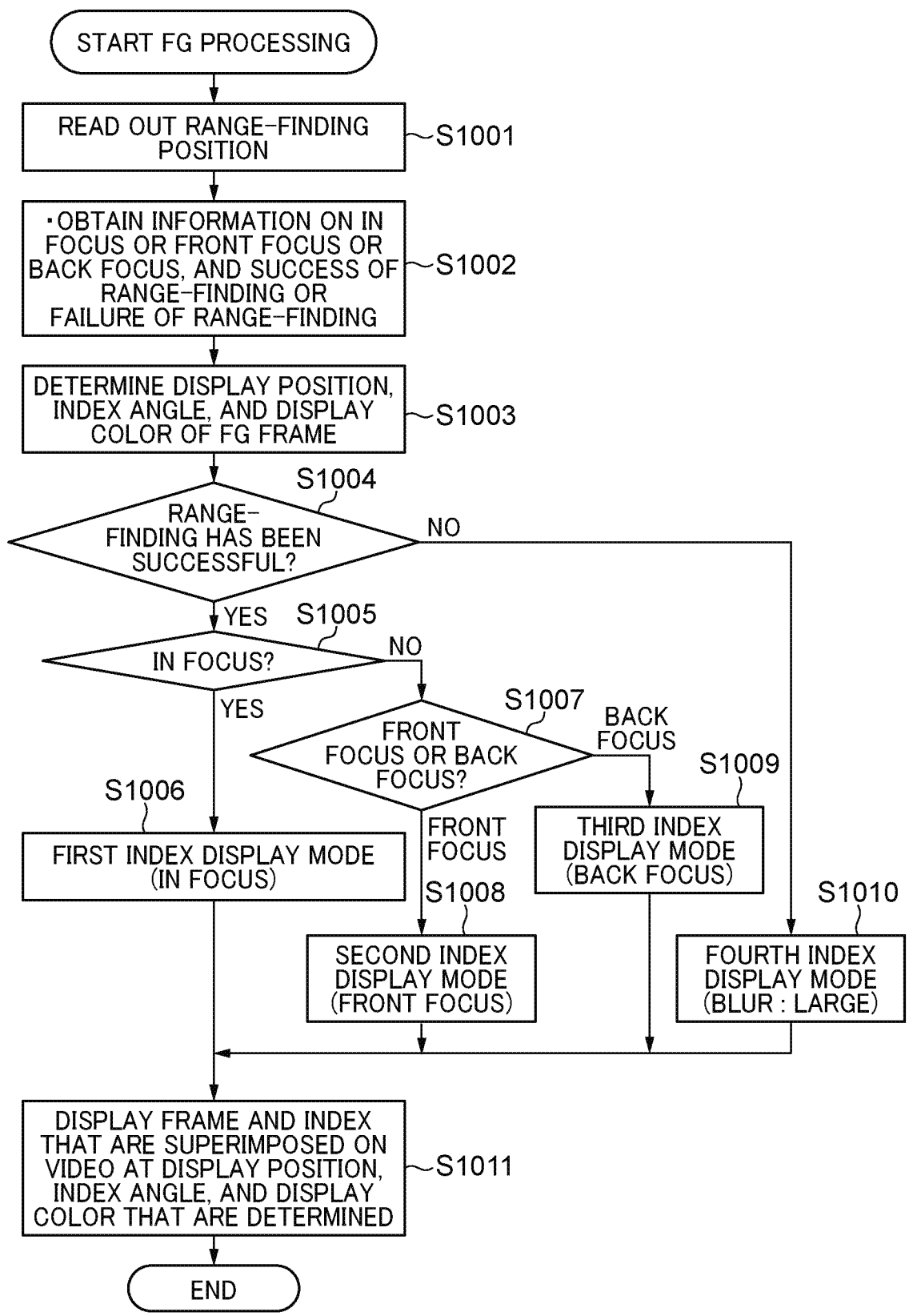
FIG. 10 is a flowchart of an FG processing executed in S515.

FIG. 10 is the flowchart of the FG processing executed in S515 of FIG. 5. In S1001, the system control unit 218 reads out a range-finding position (a position where an FG frame 1100 (see FIGS. 11A, 11B, 11C, and 11D) is set) stored in the system memory 219.

In S1002, the system control unit 218 obtains information on focusing (for example, focus information and information on success/failure of range-finding) for the subject located at the range-finding position obtained in S1001 from the image processing unit 214. It should be noted that the focus information includes information on whether the subject is in focus, so-called front focus, or so-called back focus, and in the case of the front focus or the back focus, the focus information further includes distance information between a focused focal point and the subject (information on the degree of focusing).

In S1003, the system control unit 218 determines the display position, an index angle, and a display color of the FG frame on the display unit 108 based on the information obtained in S1001 and the information obtained in S1002. In S1004, the system control unit 218 determines whether or not the range-finding has been successful based on the information obtained in S1002. In the case of determining that the range-finding has been successful (YES in S1004), the system control unit 218 executes the process of S1005. On the other hand, in the case of determining that the range-finding has not been successful (the range-finding has failed) (NO in S1004), the system control unit 218 executes the process of S1010.

In S1005, the system control unit 218 determines whether or not the subject is in focus (the subject is in an in-focus state) based on the information obtained in S1002. In the case of determining that the subject is in the in-focus state (YES in S1005), the system control unit 218 executes the process of S1006. On the other hand, in the case of determining that the subject is not in the in-focus state (the subject is in a non-in-focus state) (NO in S1005), the system control unit 218 executes the process of S1007.

In S1006, the system control unit 218 selects data corresponding to an index display mode in the case that the subject is in the in-focus state (hereinafter, referred to as "a first index display mode"), and then executes the process of S1011. It should be noted that a specific example of the first index display mode (FIG. 11A) will be described below.

In S1007, the system control unit 218 determines whether the subject is in a front focus state or in a back focus state (whether the subject is front-focused or back-focused) based on the information obtained in S1002. In the case of determining that the subject is in the front focus state, the system control unit 218 executes the process of S1008. On the other hand, in the case of determining that the subject is in the back focus state, the system control unit 218 executes the process of S1009.

In S1008, the system control unit 218 selects data corresponding to an index display mode in the case that the subject is in the front focus state (hereinafter, referred to as "a second index display mode"), and then executes the process of S1011. It should be noted that a specific example of the second index display mode (FIG. 11B) will be described below.

In S1009, the system control unit 218 selects data corresponding to an index display mode in the case that the subject is in the back focus state (hereinafter, referred to as "a third index display mode"), and then executes the process of S1011. It should be noted that a specific example of the third index display mode (FIG. 11C) will be described below.

In S1010, the system control unit 218 selects data corresponding to an index display mode in the case that the subject is largely blurred (hereinafter, referred to as "a fourth index display mode"), and then executes the process of S1011. It should be noted that a specific example of the fourth index display mode (FIG. 11D) will be described below.

In S1011, the system control unit 218 superimposes and displays the FG frame on the LV image by using the data of the index display mode selected in S1006, S1008, S1009, or S1010. Accordingly, the FG processing ends. That is, the system control unit 218 displays, on the display unit 108, the data of the selected index and the selected frame that are superimposed on the live view image (the LV image) at the display position, the index angle, and the display color that are determined in S1003.

Figure 11A:
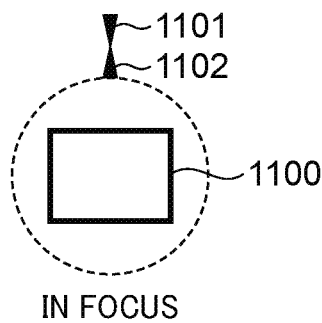
FIGS. 11A, 11B, 11C, and 11D are diagrams that show specific examples of first to fourth index display modes.

Next, the specific examples of the first to fourth index display modes will be described. FIG. 11A is a diagram that shows an example of the first index display mode, and shows a display example in the case of being determined that the subject is in focus. In the focus guide, a display based on the defocusing amount obtained from the image pickup range corresponding to the position (within the frame) where the FG frame 1100 is superimposed and displayed, is performed on the LV image.

Specifically, the focus guide indicates the degree of focusing based on the defocusing amount described below. That is, the degree of focusing is indicated based on the defocusing amount, which is calculated based on the output values from the pixel group within the range corresponding to the position of the FG frame 1100 among the pixels capable of obtaining the defocusing amount of the image pickup device of the image pickup unit 211 (among the pixels that perform the image pickup surface phase difference detection). In the exemplary embodiment of the disclosure, the display mode of the focus guide includes four display modes that are the first to fourth index display modes described above, and the focus state is expressed by display parts 1101 to 1111, which are display elements. The display parts 1101 to 1111 are arranged at an upper part of the FG frame 1100.

In the first index display mode shown in FIG. 11A which is determined that the subject is in the in-focus state, the position of the outer display part 1101 and the position of the inner display part 1102 match, and the outer display part 1101 and the inner display part 1102 are stopped at the upper part of the FG frame 1100. It should be noted that in the case of being determined that the subject is in the in-focus state, for example, the display parts 1101 and 1102 may be displayed in a color (for example, green) that is different from colors (for example, white) of other display modes. The display part 1101 is an integration of the display parts 1107 and 1108 that are shown in FIG. 11C showing the third index display mode. Similarly, the display part 1102 is an integration of the display parts 1104 and 1105 that are shown in FIG. 11B showing the second index display mode.

Figure 11B:
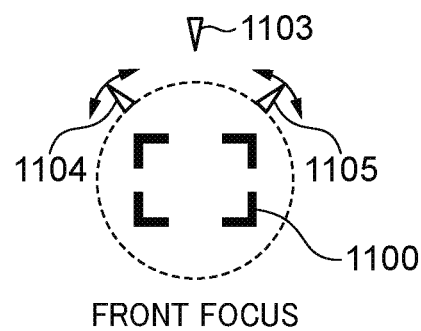
Figure 11C:
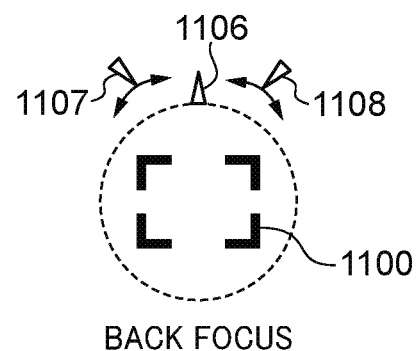

FIG. 11B is a diagram that shows an example of the second index display mode, and shows a display example in the case of the front focus where the focus is on the closest side rather than the subject. It should be noted that in the second index display mode (FIG. 11B) and the third index display mode (FIG. 11C), although the subject is not in focus, the reliability of the focus detection result is high, and therefore a direction to an in-focus position and a magnitude of the defocusing amount are indicated.

In the front focus state, while the outer display part 1103 is stopped at the upper part of the FG frame 1100, the inner display parts 1104 and 1105 move symmetrically on the circumference indicated by a broken line surrounding the FG frame 1100 as the defocusing amount changes. Here, the outer display part 1103 is illustrated as an isosceles triangle pointing inward, and the inner display parts 1104 and 1105 are illustrated as isosceles triangles pointing outward.

The positions of the display parts 1104 and 1105 represent the magnitude of the defocusing amount, and it is indicated that the defocusing amount increases as the positions of the display parts 1104 and 1105 move away from the position of the display part 1103 (a reference position). At this time, since the display parts 1104 and 1105 move on the circumference indicated by the broken line so that the bisector of the apex angle passes approximately through the center of the circle indicated by the broken line, the angle (the index angle) changes depending on the defocusing amount (the display position).

It should be noted that the display part 1103 corresponds to the display part 1101, and the state in which the display parts 1104 and 1105 overlap corresponds to the display part 1102. In other words, when the front focus state changes to the in-focus state, the display parts 1104 and 1105 are integrated and displayed as the display part 1012.

FIG. 11C is a diagram that shows an example of the third index display mode, and shows a display example in the case of the back focus where the focus is on the infinity side rather than the subject. In the back focus state, while the inner display part 1106 is stopped at the upper part of the FG frame 1100, the outer display parts 1107 and 1108 move symmetrically on the circumference indicated by the broken line surrounding the FG frame 1100 as the defocusing amount changes. Here, the inner display part 1106 is illustrated as an isosceles triangle pointing outward, and the outer display parts 1107 and 1108 are illustrated as isosceles triangles pointing inward. The positions of the display parts 1107 and 1108 represent the magnitude of the defocusing amount, and it is indicated that the defocusing amount increases as the positions of the display parts 1107 and 1108 move away from the position of the display part 1106 (a reference position). It should be noted that the display part 1106 corresponds to the display part 1102, and the state in which the display parts 1107 and 1108 overlap corresponds to the display part 1101. In other words, when the back focus state changes to the in-focus state, the display parts 1107 and 1108 are integrated and displayed as the display part 1011.

In this way, in the second index display mode and the third index display mode, the magnitude of the defocusing amount is indicated by the positions of the movable display parts, and the direction to the in-focus position (a defocusing direction) is indicated by the orientation of the display part stopped at the upper part of the FG frame 1100. As a result, the user is able to intuitively grasp (understand) the in-focus state by confirming the states of the displayed parts.

Figure 11D:
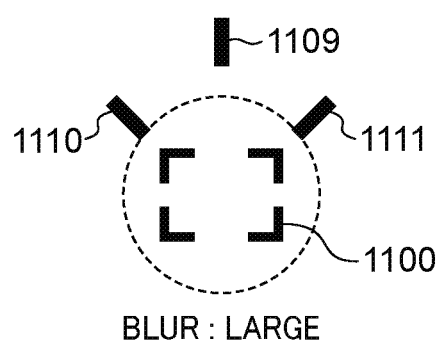

FIG. 11D is a diagram that shows an example of the fourth index display mode, and shows a display example in the case that the reliability of the focus detection result is low. In order to make the user visually aware that focus detection is not possible, in the fourth index display mode, the display parts 1109 to 1111 are set in a color (for example, gray) different from the other display modes and are fixedly displayed at predetermined positions, so that the magnitude of the defocusing amount and the defocusing direction are not indicated. In addition, in the fourth index display mode, the shapes of the display parts 1109 to 1111 are made different from the first to third index display modes, and the display parts 1109 to 1111 are shaped like short strips.

It should be noted that, as is clear from comparing FIG. 11A and FIGS. 11B to 11D, in the exemplary embodiment of the disclosure, although the display mode of the FG frame is changed depending on the in-focus state and the non-in-focus state, it is not necessary to change the display mode of the FG frame. In addition, the display mode of the focus guide is not limited to the first to fourth index display modes described above, and may be any one that indicates that the subject is in focus, and in the case that the subject is not in focus, indicates how much the subject is out of focus. In addition, in the exemplary embodiment of the disclosure, although the focus guide displays the degree of focusing based on the defocusing amount calculated from image pickup surface phase difference signals obtained from the image pickup device of the image pickup unit 211, the disclosure is not limited thereto. For example, the focus guide may display the degree of focusing based on an output value from a focus detection sensor (for example, a phase difference sensor or the like) installed at a location different from the image pickup surface, or the focus guide may display the degree of focusing based on a contrast value.

Figure 12:
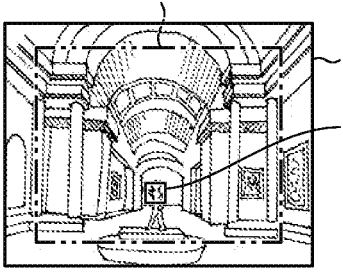
FIG. 12 is a diagram that shows display examples in S804 and S805 when a monocular lens is attached.
Figure 12:
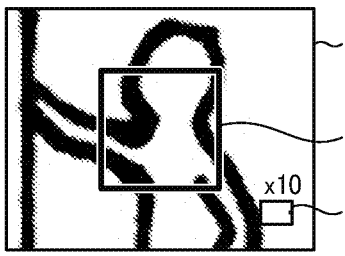
Figure 12:
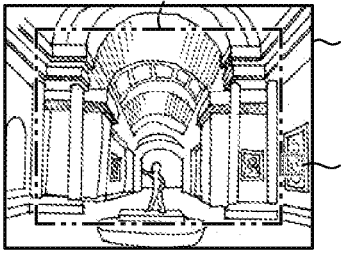
Figure 12:
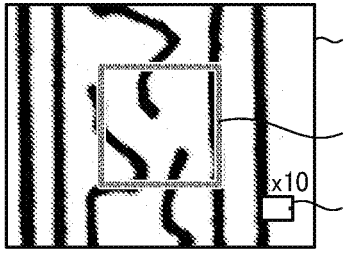
Figure 12:
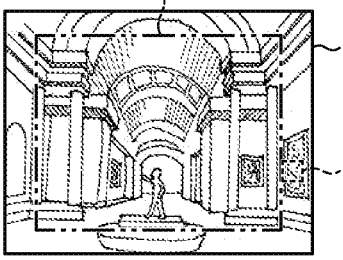
Figure 12:
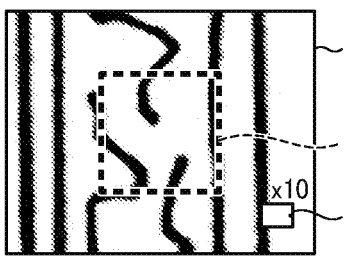
Figure 12:
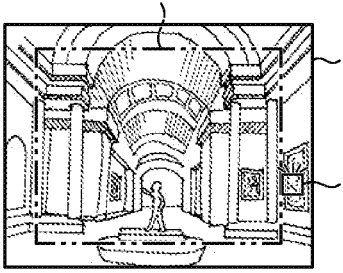
Figure 12:
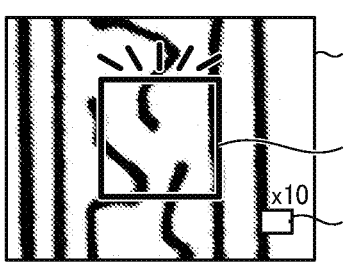
Figure 12:
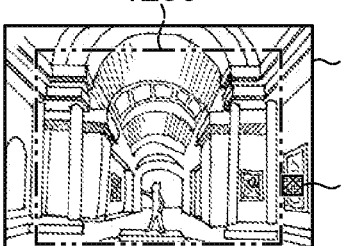
Figure 12:
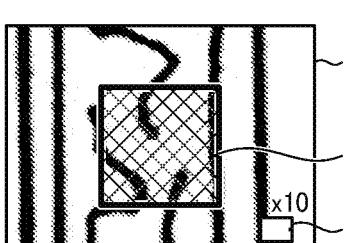

Next, specific examples of the display format in S804 and the display format in S805 (the display formats of the focus adjustment region in the unmagnification display and the enlargement display in the case that the focus adjustment is possible and in the case that the focus adjustment is not possible) will be described. FIG. 12 is a diagram that shows display examples in S804 and S805 of FIG. 8 when the monocular lens (the lens unit 200) is attached. In FIG. 12, (A) shows examples of the focus-adjustable display format in S804, and (B) to (E) show examples of the focus-unadjustable display format in S805.

In the unmagnification display in (A), since a focus adjustment region 1204 displayed on an LV image 1200 with the unmagnification display is within a focus adjustable range 1203, it is determined in S803 that the focus adjustment is possible. As a result, the focus adjustment region 1204 is displayed in the focus-adjustable display format, and specifically, the focus adjustment region 1204 is displayed by a rectangular frame drawn with a solid line having a predetermined color. In the enlargement display in (A), a focus adjustment region 1205 displayed at the center of an LV image 1201 with the enlargement display has the same display format as the focus adjustment region 1204. At this time, an indicator 1202 indicating the enlargement display is displayed.

In the unmagnification display in (B), since a focus adjustment region 1206 displayed on the LV image 1200 with the unmagnification display is outside the focus adjustable range 1203, it is determined in S803 that the focus adjustment is not possible. As a result, the focus adjustment region 1206 is displayed in a display method different from the focus adjustment region 1204, and here, the focus adjustment region 1206 is displayed by a rectangular frame drawn with a solid line having a color different from that of the focus adjustment region 1204. In the enlargement display in (B), a focus adjustment region 1207 displayed at the center of the LV image 1201 with the enlargement display is displayed in the same mode as the focus adjustment region 1206.

In the unmagnification display in (C), since a focus adjustment region 1208 displayed on the LV image 1200 with the unmagnification display is outside the focus adjustable range 1203, it is determined in S803 that the focus adjustment is not possible. As a result, the focus adjustment region 1208 is displayed in a mode different from the focus adjustment region 1204. Here, the rectangular frame indicating the focus adjustment region 1204 is displayed with the solid line having the predetermined color, and on the other hand, a rectangular frame indicating the focus adjustment region 1208 is displayed with a broken line. It should be noted that the type of the line indicating the frame of the focus adjustment region 1208 is not limited to a broken line, and may be any one of other types of lines (a two-dot chain line, a wavy line, a zigzag line, etc.). In the enlargement display in (C), a focus adjustment region 1209 displayed at the center of the LV image 1201 with the enlargement display is displayed in the same mode as the focus adjustment region 1208.

In the unmagnification display in (D), since a focus adjustment region 1210 displayed on the LV image 1200 with the unmagnification display is outside the focus adjustable range 1203, it is determined in S803 that the focus adjustment is not possible. As a result, the focus adjustment region 1210 is displayed in a mode different from the focus adjustment region 1204. Here, the rectangular frame indicating the focus adjustment region 1204 is displayed all the time (a constant display of the rectangular frame indicating the focus adjustment region 1204 is performed), and on the other hand, a frame, which is indicated by a solid line and indicates the focus adjustment region 1210, is displayed blinking (a blinking display of the frame, which is indicated by the solid line and indicates the focus adjustment region 1210, is performed). In the enlargement display in (D), a focus adjustment region 1211 displayed at the center of the LV image 1201 with the enlargement display is displayed in the same mode as the focus adjustment region 1210. It should be noted that, in (D), the blinking display is schematically shown.

In the unmagnification display in (E), since a focus adjustment region 1212 displayed on the LV image 1200 with the unmagnification display is outside the focus adjustable range 1203, it is determined in S803 that the focus adjustment is not possible. As a result, the focus adjustment region 1212 is displayed in a mode different from the focus adjustment region 1204. Here, the focus adjustment region 1212 is displayed in a mode in which a pattern (hatching, filling, or the like) is added to the inside of a rectangular frame, which is indicated by a solid line and indicates the focus adjustment region 1212. In the enlargement display in (E), a focus adjustment region 1213 displayed at the center of the LV image 1201 with the enlargement display is displayed in the same mode as the focus adjustment region 1212.

Figure 13:
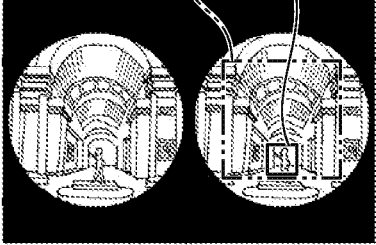
FIG. 13 is a diagram that shows display examples in S804 and S805 when the binocular lens unit is attached.
Figure 13:
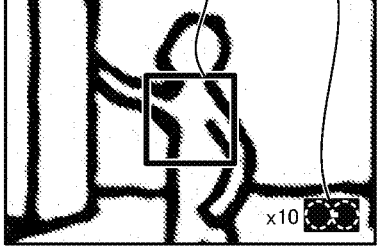
Figure 13:
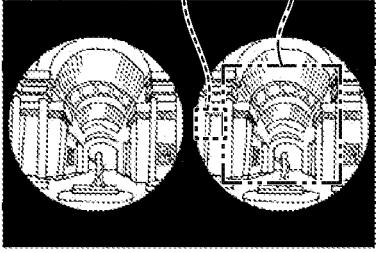
Figure 13:
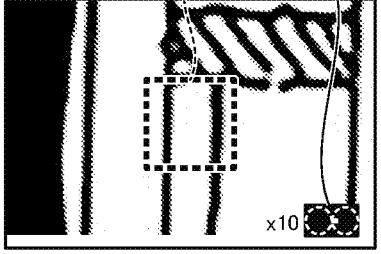

FIG. 13 is a diagram that shows display examples in S804 and S805 of FIG. 8 when the binocular lens unit 300 is attached. In FIG. 13, (A) shows examples of the focus-adjustable display format in S804, and (B) shows examples of the focus-unadjustable display format in S805.

In the unmagnification display in (A), since a focus adjustment region 1304 displayed on an LV image 1300 with the unmagnification display is within a focus adjustable range 1303, it is determined in S803 that the focus adjustment is possible. As a result, the focus adjustment region 1304 is displayed in the focus-adjustable display format. In the enlargement display in (A), a focus adjustment region 1305 displayed at the center of an LV image 1301 with the enlargement display is displayed in the same mode as the focus adjustment region 1304. It should be noted that in the case of the enlargement display, an indicator 1302 indicating the enlargement display is displayed.

In the unmagnification display in (B), since a focus adjustment region 1306 displayed on the LV image 1300 with the unmagnification display is outside the focus adjustable range 1303, it is determined in S803 that the focus adjustment is not possible. As a result, the focus adjustment region 1306 is displayed in a mode different from the focus adjustment region 1304. Here, the focus adjustment region 1304 is displayed with a solid line frame, and on the other hand, the focus adjustment region 1306 is displayed with a broken line frame. In the enlargement display in (B), a focus adjustment region 1307 displayed at the center of the LV image 1301 with the enlargement display is displayed in the same display mode (with the broken line frame) as the focus adjustment region 1306. It should be noted that similarly to FIG. 12, the display mode of the focus adjustment region 1306 and the display mode of the focus adjustment region 1307 may be other modes such as color, pattern, blinking, etc., that is, the focus adjustment region 1306 and the focus adjustment region 1307 may be displayed in other modes such as color, pattern, blinking, etc.

Figure 14A:
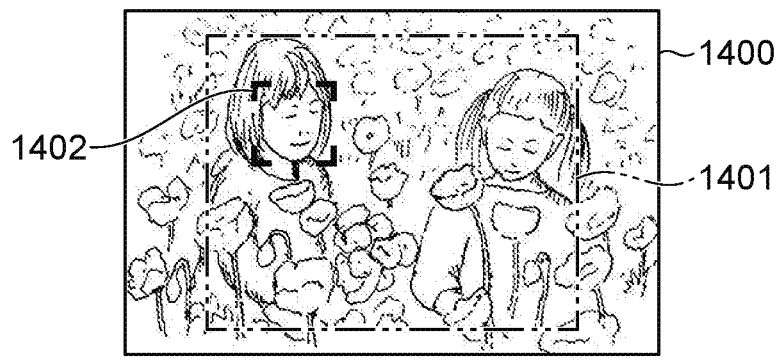
FIGS. 14A, 14B, and 14C are diagrams that show display examples in S804 and S805 in a case that there has been a movement of the focus adjustment region when a subject in a state where the monocular lens is attached is detected.
Figure 14B:
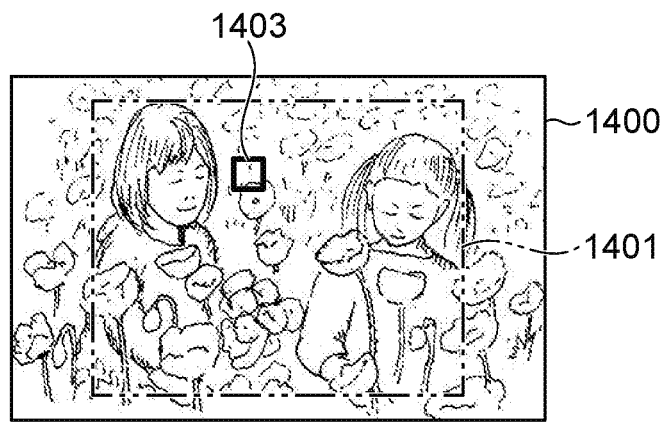
Figure 14C:
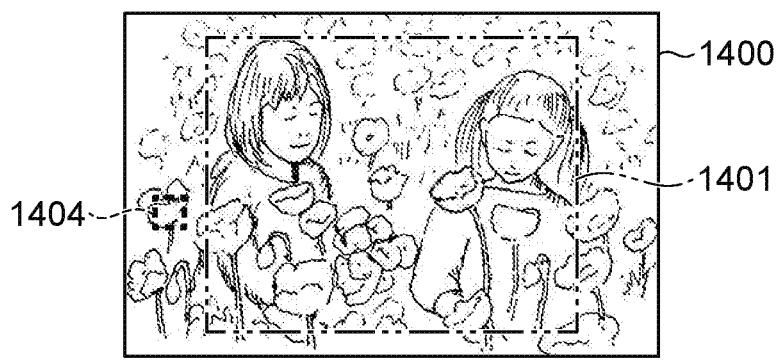

FIGS. 14A, 14B, and 14C are diagrams that show display examples in S804 and S805 in a case that a movement of the focus adjustment region is performed when a subject in a state where the monocular lens (the lens unit 200) is attached is detected.

When detecting a subject, as shown in FIG. 14A, when the subject is detected within a focus adjustable range 1401 for an LV image 1400, a focus adjustment region 1402 in a subject detection state is displayed. Even in the case that the subject moves, the focus adjustment region 1402 automatically moves in position to follow the subject as long as the moving subject is within the focus adjustable range 1401.

In the case that the user wants to move the enlargement display position, by pressing the AF frame selection/enlargement button 113 (S503), the user is able to move the position of the focus adjustment region that is the center of the enlargement display. As shown in FIG. 14B, in the case that the focus adjustment region after movement is within the focus adjustable range 1401, the display of the focus adjustment region 1402 is switched to the display of a focus adjustment region 1403 (same as the focus adjustment region 1204 in FIG. 12). On the other hand, as shown in FIG. 14C, in the case that the focus adjustment region after movement is outside the focus adjustable range 1401, the display of the focus adjustment region 1402 is switched to the display of a focus adjustment region 1404 (same as the focus adjustment region 1208 in FIG. 12).

It should be noted that the focus adjustment region 1402 in the subject detection state changes depending on the detected subject size. On the other hand, since the focus adjustment region 1403 and the focus adjustment region 1404 are used to select the position for the enlargement display, as in the focus adjustment region 1204 and the focus adjustment region 1208 of FIG. 12, the focus adjustment region 1403 and the focus adjustment region 1404 are displayed in a fixed size that does not depend on the subject size. The focus adjustment region 1404 is not limited to the focus adjustment region 1208, and may be displayed the same as any one of the focus adjustment regions 1206, 1210, and 1212.

Figure 15:
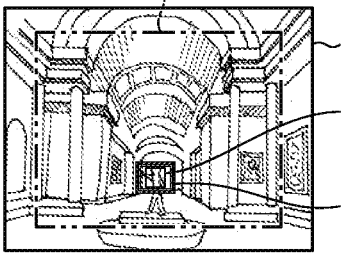
FIG. 15 is a diagram that shows other display examples in S804 and S805 when the monocular lens is attached.
Figure 15:
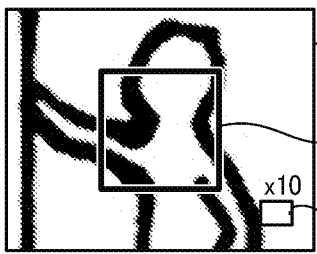
Figure 15:
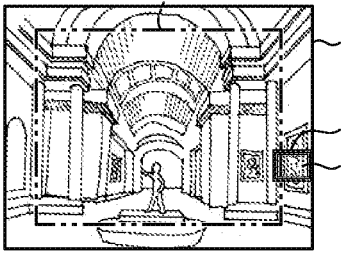
Figure 15:
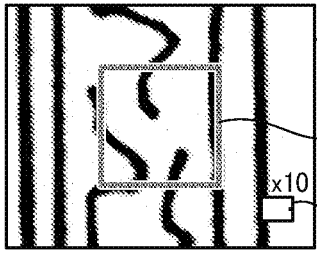
Figure 15:
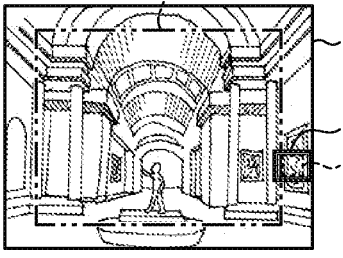
Figure 15:
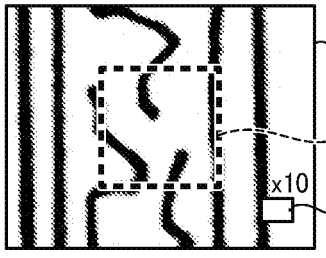
Figure 15:
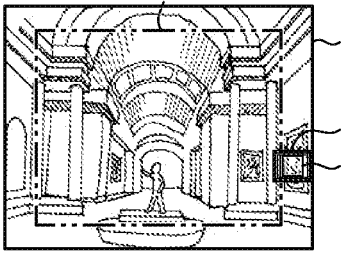
Figure 15:
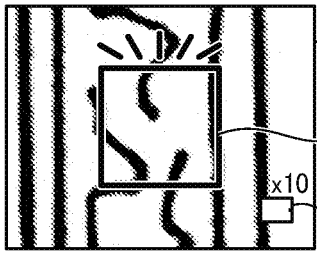
Figure 15:
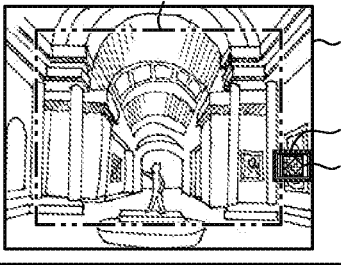
Figure 15:
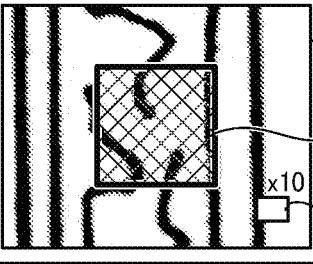

FIG. 15 is a diagram that shows other display examples in S804 and S805 of FIG. 8 when the monocular lens (the lens unit 200) is attached. It should be noted that since the display examples in FIG. 15 are modifications of the display examples in FIG. 12, as for reference numerals of the same elements as the display examples in FIG. 12, the reference numerals used in FIG. 12 are used as they are. Similar to FIG. 12, in FIG. 15, (A) shows examples of the focus-adjustable display format in S804, and (B) to (E) show examples of the focus-unadjustable display format in S805.

In the case that the LV image is displayed with the unmagnification display, when the AF frame selection/enlargement button 113 is pressed in S503, the focus adjustment region and an enlargement display region 1501 (in the case of (A), the focus adjustment region 1204 and the enlargement display region 1501) are simultaneously displayed in different modes. In other words, until the AF frame selection/enlargement button 113 is pressed in S503, in one embodiment, only the focus adjustment region is displayed as shown in the unmagnification display shown in FIG. 12.

Since the enlargement display region 1501 can be enlarged over the entire range of the LV image, the display mode of the enlargement display region 1501 does not change depending on whether the focus adjustment is possible or not, unlike the focus adjustment region. Therefore, in the enlargement display of one embodiment, only the focus adjustment region (for example, in (A), a focus adjustment region 1505) is displayed, and there is no difference between FIG. 12 and FIG. 15 regarding the enlargement display. When the LV enlargement is canceled (S610, S613), the LV image is switched from the enlargement display to the unmagnification display, and in one embodiment, only the focus adjustment region equivalent to t the unmagnification display of FIG. 12 is displayed.

As described above, according to the exemplary embodiment of the disclosure, in the state where the AF mode is selected and the AF frame is displayed, the user becomes able to select the region to be enlarged (the region for the enlargement display) from the entire LV screen. Furthermore, whether or not AF range-finding is possible in the selected region can be recognized based on the display state of the AF region. Moreover, not only when performing AF but also when performing MF, it becomes possible to recognize whether or not the focus adjustment is possible based on the display state of the focus guide.

Although the disclosure has been described above in detail based on its exemplary embodiments, the disclosure is not limited to these specific embodiments, and the disclosure also includes various forms without departing from the gist of the disclosure. Furthermore, each of the embodiments described above is merely one embodiment of the disclosure, and each embodiment can be combined as appropriate.

Furthermore, in the above exemplary embodiment, a mirrorless single-lens type digital camera is used as the image pickup apparatus according to the disclosure, but the disclosure is not limited to this. For example, the disclosure may be a variety of cameras such as a compact digital camera or a digital video camera, or may be a variety of electronic devices capable of performing image pickup by using an image pickup device. For example, the disclosure can be applied to mobile communication terminals with a camera function (mobile phones, smart phones, etc.), portable computers with a camera function (tablet terminals), portable game machines with a camera function, and the like.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-011810, filed on Jan. 30, 2023, which is hereby incorporated by reference herein in its entirety.

What is claimed is:

1. An apparatus comprising:
a pickup device configured to include pixels that photoelectrically converts incident light from a subject that has passed through different regions of an exit pupil of an optical system to generate a plurality of pickup signals; and
at least one processor and a memory coupled to the at least one processor, the memory having instructions that, when executed by the processor, causes the at least one processor to function as:
a setting unit that sets a focus adjustment region used in focus adjustment of the optical system with respect to a pickup region of the pickup device;
a detecting unit that detects a defocusing amount of the optical system based on the plurality of pickup signals obtained from the focus adjustment region;
a determining unit that determines whether or not focus adjustment in the focus adjustment region is possible based on the defocusing amount; and
a control unit that switches a display of a live view image on a display device between an unmagnification display, which displays an entire image of the pickup region, and an enlargement display, which enlarges and displays an image of the focus adjustment region, and
wherein the control unit varies a display method of the focus adjustment region between the unmagnification display and the enlargement display in accordance with to a determination result obtained by the determining unit.

2. The apparatus according to claim 1, wherein
the control unit varies a color, a mode, or a pattern indicating the focus adjustment region, and
varying the mode includes varying a type of a line used to draw a frame indicating the focus adjustment region, or varying a display of the line between a constant display and a blinking display.

3. The apparatus according to claim 1, wherein
in a case that a focus mode is set to a manual focus mode and a focus guide is set, the focus adjustment region is a focus guide frame that indicates a target region for focus adjustment.

4. The apparatus according to claim 1, wherein
in a case that a focus mode is set to an autofocus mode, the focus adjustment region is an autofocus frame that indicates a target region for focus adjustment.

5. The apparatus according to claim 1, wherein
the focus adjustment region is displayed in the same display method in the unmagnification display and the enlargement display of the live view image.

6. The apparatus according to claim 1, wherein the at least one processor further function as:
an operating unit that sets an enlargement display region to be enlarged and displayed on the display device from the live view image in a state where the live view image is displayed on the display device with the unmagnification display, and
wherein the control unit simultaneously displays the focus adjustment region and the enlargement display region in different display methods.

7. The apparatus according to claim 1, wherein
the at least one processor further function as an obtaining unit that obtains a focus adjustable range within the pickup region, and
in a case that a center of the focus adjustment region is within the focus adjustable range, the determining unit determines that focus adjustment in the focus adjustment region is possible.

8. The apparatus according to claim 1, wherein
the at least one processor further function as an obtaining unit that obtains a focus adjustable range within the pickup region, and
in a case that an outer circumference of the focus adjustment region is within the focus adjustable range, the determining unit determines that focus adjustment in the focus adjustment region is possible.

9. The apparatus according to claim 7, further comprising:
a storage unit that stores at least one of identification information about a lens attached to the apparatus, information about the focus adjustable range, and optical information for calculating the focus adjustable range, and wherein the obtaining unit obtains the focus adjustable range from the information stored in the storage unit.

10. The apparatus according to claim 7, wherein the at least processor further function as:

a communicating unit that communicates with a control unit of a lens attached to the apparatus, and wherein the obtaining unit obtains the focus adjustable range from the control unit of the lens via the communicating unit.

11. The apparatus according to claim 1, wherein the at least processor further function as:

a moving operation unit that moves the focus adjustment region, and wherein the control unit displays a frame representing a focus adjustment region after movement in a case that there has been a moving operation with respect to the focus adjustment region in a fixed size that does not depend on a size of the subject in the focus adjustment region after movement.

12. A method for an apparatus that comprises a pickup device configured to include pixels that photoelectrically converts incident light from a subject that has passed through different regions of an exit pupil of an optical system to generate a plurality of pickup signals, the method comprising:

setting a focus adjustment region used in focus adjustment of the optical system with respect to a pickup region of the pickup device;

detecting a defocusing amount of the optical system based on the plurality of pickup signals obtained from the focus adjustment region;

determining whether or not focus adjustment in the focus adjustment region is possible based on the defocusing amount; and switching a display of a live view image on a display device between an unmagnification display, which displays an entire image of the pickup region, and an enlargement display, which enlarges and displays an image of the focus adjustment region, and at that time, varying a display method of the focus adjustment region between the unmagnification display and the enlargement display in accordance with to a result of the determination.

13. The method according to claim 12, wherein in a case that a focus mode is set to a manual focus mode and a focus guide is set, the focus adjustment region is a focus guide frame that indicates a target region for focus adjustment.

14. The method according to claim 12, wherein in a case that a focus mode is set to an autofocus mode, the focus adjustment region is an autofocus frame that indicates a target region for focus adjustment.

15. The method according to claim 12, wherein the focus adjustment region is displayed in the same display method in the unmagnification display and the enlargement display of the live view image.

16. A non-transitory computer-readable storage medium storing a program for causing a computer to execute a method for an apparatus that comprises a pickup device configured to include pixels that photoelectrically converts incident light from a subject that has passed through different regions of an exit pupil of an optical system to generate a plurality of pickup signals, the method comprising:

setting a focus adjustment region used in focus adjustment of the optical system with respect to a pickup region of the pickup device;

detecting a defocusing amount of the optical system based on the plurality of pickup signals obtained from the focus adjustment region;

determining whether or not focus adjustment in the focus adjustment region is possible based on the defocusing amount; and switching a display of a live view image on a display device between an unmagnification display, which displays an entire image of the pickup region, and an enlargement display, which enlarges and displays an image of the focus adjustment region, and at that time, varying a display method of the focus adjustment region between the unmagnification display and the enlargement display in accordance with to a result of the determination.

17. The non-transitory computer-readable storage medium according to claim 16, wherein in a case that a focus mode is set to a manual focus mode and a focus guide is set, the focus adjustment region is a focus guide frame that indicates a target region for focus adjustment.

18. The non-transitory computer-readable storage medium according to claim 16, wherein in a case that a focus mode is set to an autofocus mode, the focus adjustment region is an autofocus frame that indicates a target region for focus adjustment.

19. The non-transitory computer-readable storage medium according to claim 16, wherein the focus adjustment region is displayed in the same display method in the unmagnification display and the enlargement display of the live view image.

* * * * *